(12) United States Patent
Xu et al.

(10) Patent No.: US 12,387,404 B2
(45) Date of Patent: Aug. 12, 2025

(54) GENERATING MEMES AND ENHANCED CONTENT IN ELECTRONIC COMMUNICATION

(71) Applicant: Adeia Guides Inc., San Jose, CA (US)

(72) Inventors: Ning Xu, Irvine, CA (US); Serhad Doken, Bryn Mawr, PA (US); Reda Harb, Tampa, FL (US)

(73) Assignee: Adeia Guides Inc., San Jose, CA (US)

( * ) Notice: Subject to any disclaimer, the term of this patent is extended or adjusted under 35 U.S.C. 154(b) by 214 days.

(21) Appl. No.: 18/219,473

(22) Filed: Jul. 7, 2023

(65) Prior Publication Data

US 2025/0014245 A1    Jan. 9, 2025

(51) Int. Cl.
*G06T 11/60* (2006.01)
*G06F 3/0482* (2013.01)
*G06F 40/30* (2020.01)
*H04L 51/10* (2022.01)

(52) U.S. Cl.
CPC ............ *G06T 11/60* (2013.01); *G06F 3/0482* (2013.01); *G06F 40/30* (2020.01); *H04L 51/10* (2013.01); *G06T 2200/24* (2013.01)

(58) Field of Classification Search
CPC ....................................................... G06T 11/60
USPC ......................................................... 715/753
See application file for complete search history.

(56) References Cited

U.S. PATENT DOCUMENTS

| | | | | |
|---|---|---|---|---|
| 10,015,124 B2 * | 7/2018 | McGregor, Jr. | ...... | G06V 30/274 |
| 10,567,312 B2 * | 2/2020 | Goldberg | ............. | H04L 67/306 |
| 10,853,717 B2 * | 12/2020 | Abramson | ............. | G06N 20/00 |
| 11,050,694 B2 * | 6/2021 | Rodriguez | ............ | H04L 65/403 |
| 11,093,711 B2 * | 8/2021 | Iida | ................... | G06F 18/23213 |
| 11,232,406 B1 * | 1/2022 | Michelson | ........... | G06Q 10/103 |
| 11,825,004 B1 * | 11/2023 | Halstead | ............... | A63F 13/327 |
| 12,260,374 B2 * | 3/2025 | Michelson | ............ | H04L 51/216 |
| 2006/0015560 A1 * | 1/2006 | MacAuley | ............. | A63F 13/12 |
| | | | | 709/206 |
| 2006/0089147 A1 * | 4/2006 | Beaty | ...................... | H04W 4/00 |
| | | | | 455/445 |
| 2012/0270578 A1 * | 10/2012 | Feghali | ................... | H04W 4/14 |
| | | | | 455/466 |

(Continued)

OTHER PUBLICATIONS

Amra & Elma, "Top Meme Statistics in 2022." Dec. 1, 2022. Accessed via The Wayback Machine on May 26, 2023.

(Continued)

*Primary Examiner* — Reza Nabi
(74) *Attorney, Agent, or Firm* — Haley Guiliano LLP

(57) ABSTRACT

Methods and systems are described for generating memes and enhanced content in electronic communication. The communication is received, analyzed, and assessed for determining whether the enhanced content should be included in the communication. A content, context, intent, and/or mood of the communication is determined. For meme generation implementations, images and captions are generated based on the communication. Some candidate memes incorporate an image of one of the participants in the communication. Enhanced content candidates are generated and presented to the user for inclusion in the communication. Artificial intelligence systems, including neural networks, and models are utilized to improve the enhanced content generation. Related apparatuses, devices, techniques, and articles are also described.

16 Claims, 12 Drawing Sheets

(56) References Cited

U.S. PATENT DOCUMENTS

| | | | | |
|---|---|---|---|---|
| 2015/0271119 | A1* | 9/2015 | Goncalves | H04L 51/216 709/206 |
| 2016/0080298 | A1* | 3/2016 | Oh | H04L 51/063 709/206 |
| 2018/0314409 | A1* | 11/2018 | Adilipour | H04L 51/10 |
| 2020/0007958 | A1* | 1/2020 | Wondra | G06Q 50/01 |
| 2020/0382454 | A1* | 12/2020 | Gershony | H04L 51/02 |
| 2021/0158594 | A1* | 5/2021 | Huang | H04N 5/2628 |
| 2021/0314284 | A1* | 10/2021 | Zhai | G06F 40/30 |
| 2022/0147206 | A1* | 5/2022 | Zhai | G06F 3/04895 |
| 2022/0182343 | A1* | 6/2022 | Lee | G10L 15/22 |
| 2022/0360551 | A1* | 11/2022 | Cha | G06Q 10/10 |
| 2023/0066331 | A1* | 3/2023 | Kumar | G06V 40/174 |
| 2023/0105825 | A1* | 4/2023 | Agarwal | G16H 40/20 705/2 |
| 2023/0300095 | A1* | 9/2023 | Chen | G06F 3/0482 715/716 |
| 2023/0333729 | A1* | 10/2023 | Lin | G06F 3/0487 |
| 2023/0333867 | A1* | 10/2023 | Agarwal | G06F 40/205 |
| 2024/0143149 | A1* | 5/2024 | Duperron | H04L 9/50 |
| 2024/0195770 | A1* | 6/2024 | Cheng | G06Q 50/00 |
| 2025/0014245 | A1* | 1/2025 | Xu | H04L 51/10 |

OTHER PUBLICATIONS

BroadbandSearch, "Average Time Spent Daily on Social Media." Nov. 1, 2019. Accessed via The Wayback Machine on May 26, 2023.

Canva, "Introvert Koala Simple Photo and Text Meme." Nov. 17, 2022. Accessed via The Wayback Machine on May 26, 2023.

Chudasama, Vishal, et al. "M2FNet: multi-modal fusion network for emotion recognition in conversation." Proceedings of the IEEE/CVF Conference on Computer Vision and Pattern Recognition. 2022.

Devlin, Jacob, et al. "Bert: Pre-training of deep bidirectional transformers for language understanding." arXiv preprint arXiv:1810.04805 (2019).

Digital Information World, "Over 1 in Every 5 Tweets Contain an Emoji, New Study Reveals." Jul. 25, 2021. Accessed via The Wayback Machine on May 26, 2023.

Greyling, C. "Using GPT-3 to Measure Sentiment." Medium. Jun. 13, 2021. Accessed via The Wayback Machine on May 26, 2023.

Imgflip, "This Meme Does Not Exist." Apr. 11, 2019. Accessed via The Wayback Machine on May 26, 2023.

Liu, Qian, et al. "You impress me: Dialogue generation via mutual persona perception." arXiv preprint arXiv:2004.05388 (2020).

Liu, Zhiyuan, et al. "Multi-modal application: Image Memes Generation." arXiv preprint arXiv:2112.01651 (2021).

OpenAI, "Customizing GPT-3 for Your Application." Dec. 14, 2021. Accessed via The Wayback Machine on May 26, 2023.

Peirson V, Abel L., and E. Meltem Tolunay. "Dank learning: Generating memes using deep neural networks," arXiv preprint arXiv:1806.04510 (2018).

Ruiz, Nataniel, et al. "Dreambooth: Fine tuning text-to-image diffusion models for subject-driven generation." Proceedings of the IEEE/CVF Conference on Computer Vision and Pattern Recognition. 2023.

Sadasivam, Aadhavan. memeBot: Automatic Image Meme Generation for Online Social Interaction. Diss. Arizona State University, 2020.

Song, Xiaohui, et al. "Emotionflow: Capture the dialogue level emotion transitions." ICASSP 2022-2022 IEEE International Conference on Acoustics, Speech and Signal Processing (ICASSP). IEEE, 2022.

Sung, M. "The AI meme generator is better at making memes than humans." Mashable. Apr. 29, 2020. Accessed via The Wayback Machine on May 26, 2023.

* cited by examiner

GENERATING MEMES AND ENHANCED CONTENT IN ELECTRONIC COMMUNICATION

FIELD OF THE INVENTION

The present disclosure relates to imaging and content generation. More particularly, the present disclosure relates to imaging including computational imaging, computer vision, image processing, video processing, and the like. Information from a communication is utilized to generate enhanced output. The enhanced output includes at least one of a meme (e.g., image plus caption), an animated image, an emoji, an avatar, combinations of the same, or the like.

SUMMARY

Chatting with text and multimedia messages plays a significant role in daily life. Internet-connected devices utilizing chatting and social media applications allow users to incorporate pictures, captions, emojis, and animated images (e.g., animated graphics interchange format (GIF) images) into the chat. The use of images, graphics, and memes in chatting and messaging is increasingly popular. Electronic communication, including chatting, online conversation, sending camera-captured pictures, instant messaging, direct messaging, private messages and sending messages in group chats, is common on social media, which is popular globally. On average, users spend about two and a half hours per day on social media platforms, about a half hour per day on Snapchat and Twitter, and the same amount of time on WhatsApp. About one in five tweets include an emoji. About three-quarters of users aged 13 to 36 share static memes on social media. The meme marketplace is expected to grow to about $6.1 billion by 2025.

Memes, also known as internet memes and viral memes, generally refer to humorous or relatable images, videos, or text that spread across the internet, often accompanied by manual captions or alterations based on current events, personal experiences, jokes, and more. Internet memes are rooted in the more general concepts of memes, e.g., idea, behavior, or style that spreads by means of imitation from person to person within a culture and often carries symbolic meaning representing a particular phenomenon or theme. Memes may serve as a form of social and/or cultural currency in messaging and social media platforms, encapsulating shared ideas, jokes, or references that resonate with a wide online audience.

Finding an apropos meme is not an easy task and responding to a message or post quickly with a suitable meme is generally a goal for internet-based social interactions. In some approaches, when a user engaged in a chat wishes to include a premade meme in the chat, the user manually searches for an appropriate meme or creates one from scratch, and copies-and-pastes such meme from an external source into the chat. This process requires resources and is inconvenient. Some approaches may include a toolbar in the keyboard area to allow quicker and easier insertion of a meme. Such an approach still requires a keyword search and presenting low-resolution thumbnails of several memes in a small window. Moreover, the available selection of premade memes is limited by the database size and minimal tagging.

The generation of a custom-tailored meme from scratch involves choosing a template image and populating text fields. Some approaches receive a manually input sentence and return a template image and caption. Auto-completion technologies for chat windows are typically restrictive. In another approach, a user image is received, a subject in the user image is identified, and variations on the identified subject of the user image are identified; however, captions are not generated, and the approach is not applied to online communications. A need has arisen for improvement of generating content, e.g., a meme, an animated image, and the like, for electronic communications.

As disclosed herein, a meme is generated based on electronic communications. A context of an electronic communication is received and analyzed. A user profile and user preferences are accessed. Users associated with user profiles and involved in the communication are analyzed. An optimal time for generating candidates for enhanced content is determined. The enhanced content includes customized memes. The user is prompted to choose from one or more candidates. The context of the communication is used to generate and complete an answer or a response to text in a chat window. Current events, popular concepts happening contemporaneously, and the like are used to enhance the context in some embodiments. A likely mood and emotional state of the communication are determined in some embodiments. The likely mood and the emotional state are utilized to modify the output. In some embodiments, the context includes at least one user engaged in an online communication.

In some embodiments, a user is engaged in a live, online chat with a friend. In response to a question from the friend and/or while the user types a response in the chat, a context and/or subject of the chat is determined, a suitability for a meme response is determined, and, when the context and/or the suitability are favorable, meme candidates are generated and presented to the user below a text input box as options for inclusion in the chat. Unlike static memes, when the subject of the chat involves a concurrently occurring live event such as a sporting event, the candidate memes include topical information. Although memes are explained in detail, the system is configurable to generate other forms of output including at least one of an animated image, an emoji, an avatar, combinations of the same, or the like. Generative artificial intelligence (AI), machine learning (ML), trained models, and the like, are leveraged to ensure the candidate memes are responsive, engaging, and appropriate to the content. Reinforcement, verification, and feedback mechanisms, whether occurring during the chat or built into external systems utilizing the AI, ML, models, and the like, improve the candidate memes over time.

Information is collected and processed. The information includes, in some embodiments, the electronic communication itself, the context of the communication, the user profile, the user preferences, and the likely mood or emotional state. The information is combined in any suitable combination. One or more candidate memes are generated based on the combined information.

A meme generation model is provided in some embodiments. The meme generation model is a text-to-image diffusion model, for example. The text-to-image diffusion model is tuned for meme generation. The generated meme includes an image, a caption, and the like. Options for personalization of the generated meme are provided. One option for personalization includes an image provided by a user, so that a candidate meme includes a likeness of the user. Personalization includes one or more potential readers of the communication. For example, for meme generation, the personalization of the communication is tailored to followers of the user posting the communication in some embodiments. For example, the personalization is tailored to a social circle of a social media website to which the user belongs.

A captioning model is provided in some embodiments. The captioning model is used to generate a caption for the meme. The generated caption is based on at least one of input text, auto-completed sentences, the user profile, the user preferences, the generated meme images noted herein, combinations of the same, or the like. The captioning model automatically selects enhancements such as font properties and caption locations.

A communication user interface is provided in some embodiments. The communication user interface utilizes at least one of the communication itself, the various derivatives of the communication including the context, output of one or more of the models, combinations of the same, or the like. The communication user interface is integrated into various types of communication systems.

The present invention is not limited to the combination of the elements as listed herein and may be assembled in any combination of the elements as described herein.

These and other capabilities of the disclosed subject matter will be more fully understood after a review of the following figures, detailed description, and claims.

BRIEF DESCRIPTIONS OF THE DRAWINGS

The present disclosure, in accordance with one or more various embodiments, is described in detail with reference to the following figures. The drawings are provided for purposes of illustration only and merely depict non-limiting examples and embodiments. These drawings are provided to facilitate an understanding of the concepts disclosed herein and should not be considered limiting of the breadth, scope, or applicability of these concepts. It should be noted that for clarity and ease of illustration these drawings are not necessarily made to scale.

The embodiments herein may be better understood by referring to the following description in conjunction with the accompanying drawings, in which like reference numerals indicate identical or functionally similar elements, of which:

The drawings are intended to depict only typical aspects of the subject matter disclosed herein, and therefore should not be considered as limiting the scope of the disclosure. Those skilled in the art will understand that the structures, systems, devices, and methods specifically described herein and illustrated in the accompanying drawings are non-limiting embodiments and that the scope of the present invention is defined solely by the claims.

DETAILED DESCRIPTION

Automatic, contemporaneous, in-line generation of meme suggestions during chat sessions is provided. Automatic meme generation is convenient and effortless for the user. The meme generation includes generation of an image and a caption. In some embodiments, the generated memes are personalized based on communication context, user profiles, and user preferences. In some embodiments, meme generation occurs in real-time, and/or simultaneously with user chat activity.

Meme generation leverages AI and ML to achieve a natural language understanding of message context. Large models are pre-trained and leveraged into the automatic meme generation. The automated meme generation includes determining a context, an intent, and/or a mood of an electronic communication. Suggestions are generated including responsive images and captions based on the determined context, intent, and/or mood. The suggestions convey emotion in the communication. Users are prompted for feedback regarding the generated suggestions, which inform the trained models and promote customization per user, group, or communication.

The determined content, context, intent, and/or mood of the communication, details from a user profile, user preferences, and the like are analyzed. Inferences are based on the analyzed information. The inferences include a decision of whether and when to generate and display a plurality of candidate memes for user selection. As a result of the analysis, memes are suggested at a point in time best suited for the communication. The analyzed information is utilized as an input for image generation. The analyzed information is input into a text-to-image diffusion model. The model is fine-tuned for generating meme images; that is, for example, weights of a pre-trained model are trained on data. The model is personalized with user-specific information, including a user's profile images.

Captions for the images are generated. The captions are based, in some embodiments, on auto-completed sentences, the analyzed information, a meme generated in a previous step, and the like. Formatting for the captions such as font properties and caption locations is provided.

A user interface (UI) for meme generation is provided. The UI prompts the user to choose among a plurality of candidates. In some embodiments, the UI prompts the user for modifications, display of additional candidate memes, feedback, and the like.

Figure 1:
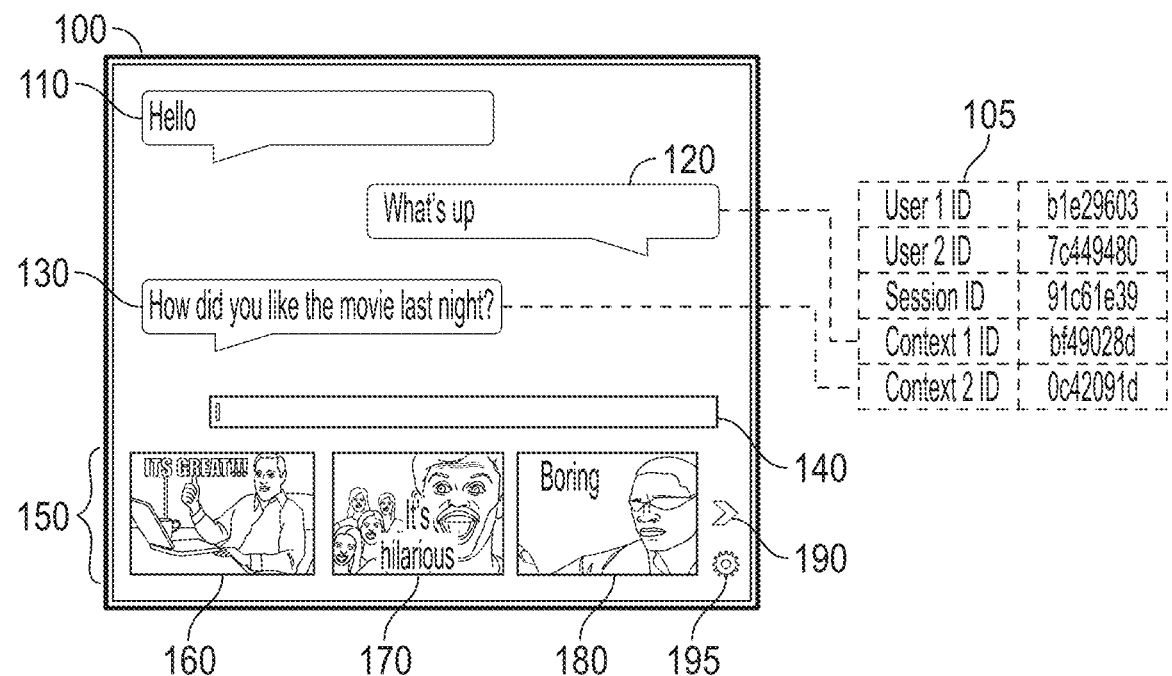
FIG. 1 depicts a chat window with selectable meme suggestions, a selectable configuration icon, and a portion of a database, in accordance with some embodiments of the disclosure.
Figure 2:
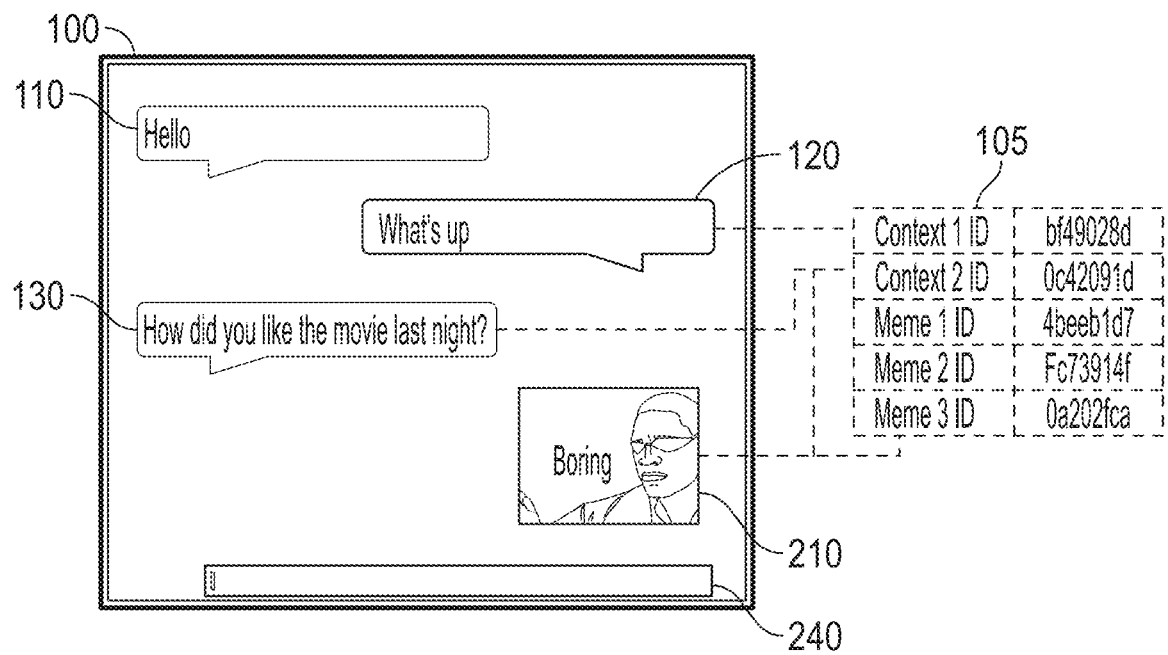
FIG. 2 depicts the chat window after selection of one of the selectable meme suggestions, incorporation of the selected meme into the chat, and an updated portion of the database, in accordance with some embodiments of the disclosure.
Figure 4:
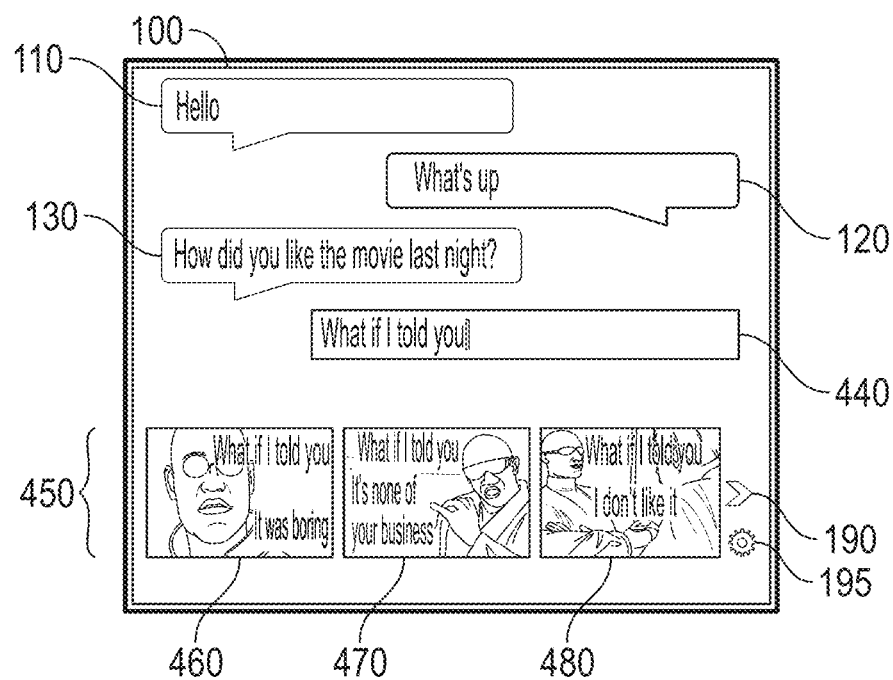
FIG. 4 depicts the chat window with another set of selectable meme suggestions based on partial text entered by a user, in accordance with some embodiments of the disclosure.

FIGS. 1, 2, and 4 illustrate, in various embodiments, a UI that promotes inclusion of automatically generated memes in an electronic communication. The electronic communication is an online communication in some embodiments. In some embodiments, the online communication occurs in real-time. In some embodiments, before the user starts to type a next response in a chat thread, a context of a communication is determined. A prediction of possible answers or responses appropriate for the communication is based on the determined context. In some embodiments, a communication AI is configured to make the prediction. A set of candidate memes are generated with captions. The context determination, prediction, and candidate meme generation occur in real-time or near real-time, in some embodiments. Each of the candidate memes is selectable by the user. Upon selection, the selected meme is inserted into the communication and thus viewable to one or more other users participating in the communication. In some embodiments, a single click on a candidate meme results in sending the selected meme to others in the communication.

Specifically, FIG. 1 depicts a chat window 100 displayed on a display device of a first user. The chat window 100 of FIG. 1 corresponds with a point in time after three messages are exchanged between the first user and a second user, i.e., a first message 110 from the second user to the first user sending a text message (e.g., "Hello"); a second message 120 from the first user to the second user responding to the first message 110 (e.g., "What's up"); and a third message 130 from the second user to the first user posing a question (e.g., "How did you like the movie last night?"). The chat window 100 includes a prompt field 140, which reflects, for example, characters typed by the first user during the communication. From a perspective of the first user, the prompt field 140 will populate in response to the first user typing or entering information via an input device. For example, the input device is at least one of a keyboard, a touchscreen, a mouse, a virtual input system (e.g., a virtual keyboard in virtual reality applications), an audio input device, a speech-to-text input device, a transcription device, a combination of the same, or the like.

In some embodiments, a determination is made that the first message 110 and the second message 120 are introductory in nature, and meme generation mode is not enabled; whereas, the third message 130 is a question, and a determination is made that the third message 130 is a suitable candidate for meme generation.

The chat window 100 includes a generated meme selection field 150. In some embodiments, the generated meme selection field 150 includes a plurality of generated candidate memes. In the embodiment of FIG. 1, three candidate memes are generated in the generated meme selection field 150. Any suitable number of candidate memes may be provided. The generated memes may be generated by any of the processes disclosed herein.

In the embodiment of FIG. 1, each of the three candidate memes is generated using a different process. A first meme candidate 160 is generated based on a template (e.g., one of a known group of templates, i.e., a "thumbs up" version of a "Hide the Pain Harold" template), which is chosen based on a determined context of the communication and with a caption (e.g., "IT'S GREAT!!!") populated by any of the captioning processes disclosed herein. A second meme candidate 170 is generated using a text-to-image process. In some embodiments, the text-to-image process generates images and captions based on predicted answers and a determined context of the communication. A third meme candidate 180 is generated using the user's profile, a text-to-image process, and a determined context of the communication. In this example, the generated image has attributes extracted from the image from the user's profile. The extracted attributes include a facial appearance resembling that of the user, a hairstyle of the user, accessories worn by the user, clothing worn by the user, and the like. The caption (e.g., "Boring") is generated by any of the captioning processes disclosed herein.

In some embodiments, different candidate memes are generated based on a determination of whether the communication is a private chat (e.g., between limited participants) or public (e.g., where a wide audience does not necessarily share a social relationship to the user). In some embodiments, for instance when it is determined that the tone or mood of the conversation is confrontational or contrasting but otherwise light and friendly, the candidate memes are deliberately contrasting. For example, a sarcastic comment from one user results in generation and suggestion of serious meme candidates from the other user in the conversation, or vice-versa.

The communication is analyzed to determine and identify information about the communication in a database 105. Portions of the database are shown in FIGS. 1 and 2. In this example, an identity of the first and second users, session identifications, context identifications, generated meme identifications, and the like are tracked and updated in the database 105 as the communication progresses. In some embodiments, each context of the communication is identified and tracked, and a selection of a candidate meme is associated with the identified context. Such tracking facilitates deep learning of the success or failure of a given candidate.

In this example, a first column of the database 105 includes data types including User 1 ID, User 2 ID, Session ID, Context 1 ID, Context 2 ID, Meme 1 ID, Meme 2 ID, Meme 3 ID, and the like. Respective unique identifiers for each data type are provided in a second column of the database 105 (e.g., b1e29603, 7c449480, 91c61e39, bf49028d, 0c42091d, 4beeb1d7, Fc73914f, 0a202fca, respectively). The identifiers are random 8-character alphanumeric strings as shown in this example; however, any suitable identification system is provided for the database 105. In some embodiments, the identifiers for each of the Session ID, Context 1 ID, Context 2 ID, Meme 1 ID, Meme 2 ID, Meme 3 ID, and the like, incorporate a common reference to the User 1 ID and the User 2 ID. That is, for example, each of the Session ID, Context 1 ID, Context 2 ID, Meme 1 ID, Meme 2 ID, Meme 3 ID, and the like incorporates as the common reference the identifiers of the User 1 ID and the User 2 ID, e.g., "b1e29603-7c449480 . . . " is the leading identifier for each of the Session ID, Context 1 ID, Context 2 ID, Meme 1 ID, Meme 2 ID, Meme 3 ID, and the like. Tracking of determined contexts for each communication is described in greater detail herein.

The user is prompted to browse and provided options to select one of the automatically generated memes, as shown in FIG. 2. That is, upon selection of one of the candidate memes, the selected meme is incorporated into the communication. In the example of FIGS. 1 and 2, the third meme candidate 180 is selected by the user in FIG. 1, which results in the incorporation of the third meme candidate 180 into the communication as shown in FIG. 2. In this example, the database 105 tracks the user's selection by associating the Meme 3 ID of 0a202fca for the third meme candidate 180 with the Context 2 ID of 0c42091d associated with the third message 130.

The generated meme selection field 150 includes an expand button 190 in some embodiments. Selection of the expand button 190 results in display of additional meme candidates, e.g., after selection of the button 190, the second and third candidates are shown and a fourth candidate is displayed as a third option, or selection of the button 190 results in replacement of the first, second and third candidates with fourth, fifth, and sixth candidates. In lieu of the button 190, a scrub bar or any other navigation element is provided for presenting candidate memes options to the user.

Figure 3:
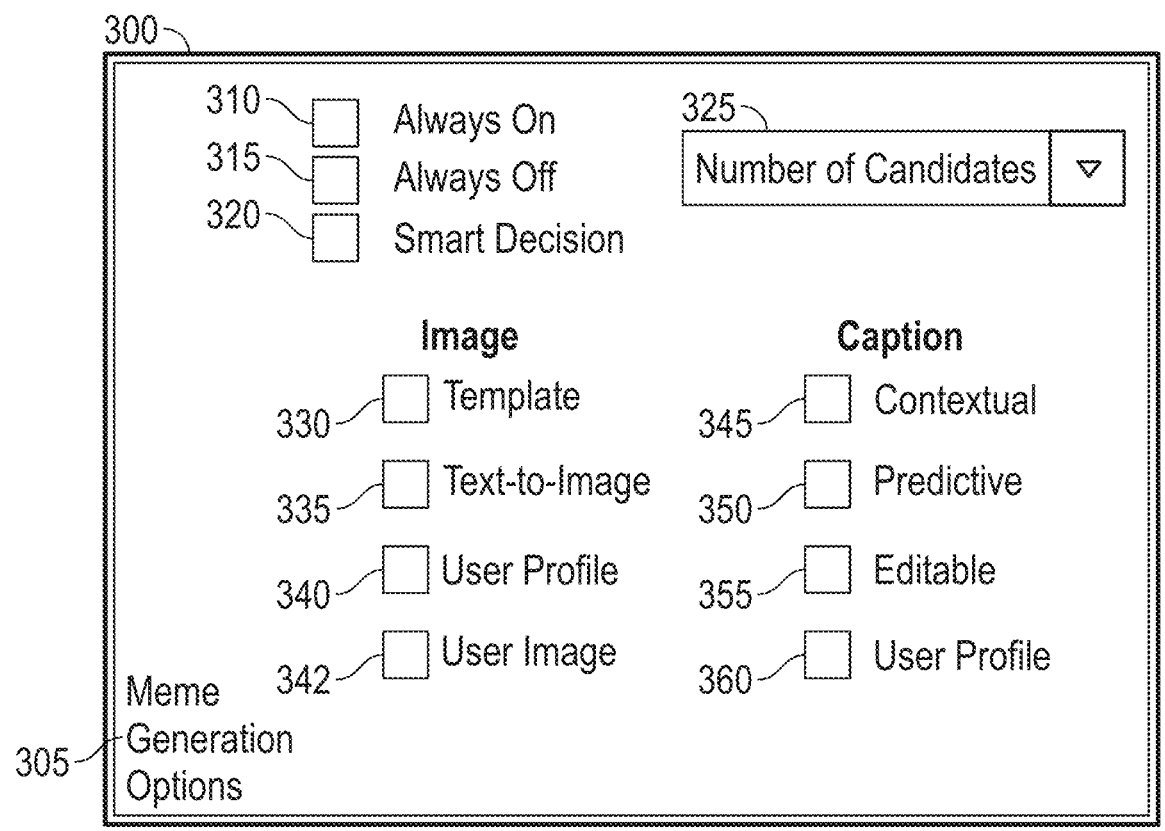
FIG. 3 depicts a meme generation options menu presented after selection of the selectable configuration icon, in accordance with some embodiments of the disclosure.

The generated meme selection field 150 includes a configuration button 195 in some embodiments. Selection of the configuration button 195 results in display of a meme generation options menu 300 as depicted in FIG. 3. For example, the meme generation options menu 300 includes at least one of a caption 305 (e.g., "Meme Generation Options"), a selectable "Always On" button 310, a selectable "Always Off" button 315, a selectable "Smart Decision" button 320, a drop box for selecting a number of candidates 325, or options for image and caption generation. The options for image generation include at least one of a selectable template button 330, a selectable text-to-image button 335, a selectable user profile button 340, or a selectable user image button 342. The options for caption generation include at least one of a selectable contextual button 345, a selectable predictive button 350, a selectable editable button 355, or a selectable user profile button 360. The meme generation options menu 300 is not limited to that shown in FIG. 3 and includes, in some embodiments, additional selectable options for control of meme generation. In some embodiments, the meme generation options menu 300 includes options for image generation based on at least one of a context determined from the portion of the communication, a text-to-image process, a user profile, a user-provided image, a meme template, combinations of the same, or the like. In some embodiments, the meme generation options menu 300 includes options for caption generation based on at least one of a context determined from the portion of the communication, an image-to-text process, a user profile, a meme template, combinations of the same, or the like. The meme generation options menu 300 includes, in some embodiments, prompts for specifying a language type preference, an image style preference, a caption color preference, and the like. Although the button 195 is shown as a single option, in some embodiments, configuration buttons may be generated for each candidate.

In response to user selection of the selectable "Always On" button 310, the generated meme selection field 150 appears at all times during the communication and updates as the communication progresses. In response to user selection of the selectable "Always Off" button 315, the generated meme selection field 150 is deactivated and does not appear in the communication. In response to user selection of the selectable "Smart Decision" button 320, an on-off decision-making module is utilized, which is described in greater detail herein. In response to user selection of any one of the selectable "Always On" button 310, the selectable "Always Off" button 315, and the selectable "Smart Decision" button 320, the other two of the group are deactivated.

In response to user selection of the drop box for selecting a number of candidates 325, for example, selectable integers are displayed from 1 to a maximum number. When a number of candidates is selected, the number may appear instead of the label "Number of Candidates" as shown in FIG. 3. In some embodiments, when a default number of candidates is 3, the expand button 190 only appears if the selected number of candidates is 4 or greater.

In response to user selection of the selectable template button 330, image generation for the candidate meme is based on a template meme image, such as the first meme candidate 160 shown in FIG. 1. In response to user selection of the selectable text-to-image button 335, image generation for the candidate meme is based on a text-to-image module, described in greater detail herein, such as the second meme candidate 170 shown in FIG. 1. In response to user selection of the selectable user profile button 340, image generation for the candidate meme is based on the user profile, described in greater detail herein, such as the third meme candidate 180 shown in FIG. 1. In response to user selection of the selectable user image button 342, image generation for the candidate meme is based on the user image, described in greater detail herein. In some embodiments, each of the selectable buttons 330, 335, 340, 342 includes a selectable option to set a default position in the generated meme selection field 150 of FIG. 1. For instance, as noted above, the first meme candidate 160 is generated based on a template and is displayed first in the list of candidates, the second meme candidate 170 is generated using a text-to-image process and is displayed second in the list of candidates, and the third meme candidate 180 is generated using the user's profile, a text-to-image process, and a determined context of the communication, and is displayed third in the list of candidates. In some embodiments, selection of the selectable "Smart Decision" button 320 disables the selectable buttons 330, 335, 340, 342.

In response to user selection of the selectable contextual button 345, caption generation for the candidate meme is based on a contextual analysis of the communication, which is described in greater detail herein. In response to user selection of the selectable predictive button 350, caption generation for the candidate meme is based on a predictive analysis of the communication, which is described in greater detail herein. In response to user selection of the selectable editable button 355, a user is prompted to enter a caption. In response to user selection of the selectable user profile button 360, the caption is based on the user profile. In some embodiments, selection of the selectable "Smart Decision" button 320 disables the selectable buttons 345, 350, 355, 360.

As shown in FIG. 1, candidate memes are generated based on a context of the communication. If a user continues typing, as shown in FIG. 4, a typed partial answer is used together with the communication context to complete the answer and generate one or more candidate memes. In this example, the user types "What if I told you" into a prompt field 440. In response to this partial sentence, substantially in real-time, candidate memes based on the partial text are generated and the generated meme selection field 450 is replaced with a generated meme selection field 450, in which candidates are instead based on the entered text of "What if I told you." In the example of FIG. 4, a first candidate meme 460 is based on a template, a second candidate meme 470 is based on a text-to-image process and a description from the user profile, and a third candidate meme 480 is based on a text-to-image process and an image from the user's profile. The caption for each candidate meme includes the entered text of "What if I told you" and an automatically generated conclusion to the sentence, e.g., "It was boring" in the first candidate meme 460, "It's none of your business" in the second candidate meme 470, and "I don't like it" in the third candidate meme 480. Selection of the expand button 190 allows the user to browse through additional generated memes. As with the example of FIGS. 1 and 2, the user is prompted to select one of the candidate memes for inclusion in the communication. In some embodiments, selection of one of the candidate memes 460, 470, 480, which includes the entered text of "What if I told you" replaces the prompt field 440 with the selected meme. As with the example of FIGS. 1 and 2, selection of the configuration button 195 allows the user to change settings for the meme generation process. Although not shown in FIG. 4, it is understood that a database similar to the database 105 is populated for the example of FIG. 4. That is, autocompleted responses are associated with, e.g., at least one of the User 1 ID, the User 2 ID, the Session ID, the Context 1 ID, the Context 2 ID, the Meme 1 ID, the Meme 2 ID, the Meme 3 ID, or the like.

Figure 5:
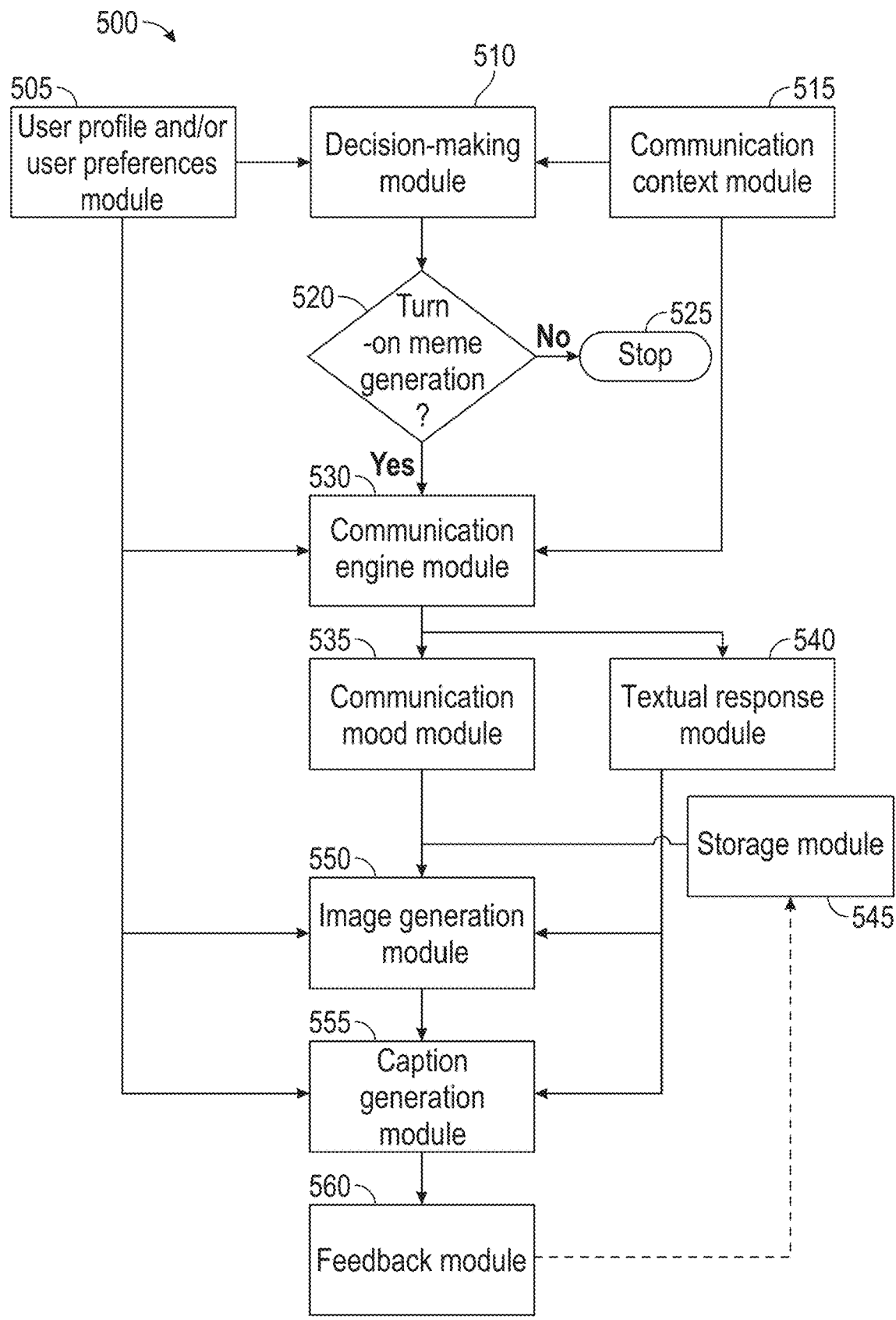
FIG. 5 depicts a system for generating meme suggestions, in accordance with some embodiments of the disclosure.

FIG. 5 illustrates a system 500 for generating personalized in-communication meme recommendations. The system 500 includes at least one of a user profile and/or user preferences module 505, a decision-making module 510, a communication context module 515, a communication engine module 530, a communication mood module 535, a textual response module 540, a storage module 545, an image generation module 550, a caption generation module 555, a feedback module 560, combinations of the same, or the like. In some embodiments, the user profile and/or user preferences module 505 is configured to transmit the user profile and/or user preferences information to each of the decision-making module 510, the communication engine module 530, the image generation module 550, and the caption generation module 555, each of which is configured to receive and process the user profile and/or user preferences information, respectively. In some embodiments, the communication context module 515 is configured to transmit communication context information to the decision-making module 510 and the communication engine module 530, each of which is configured to receive and process the communication context information, respectively. In some embodiments, the communication engine module 530 is configured to transmit information to the communication mood module 535 and the textual response module 540, each of which is configured to receive and process the information, respectively. In some embodiments the communication mood module 535 is configured to transmit communication mood information to the image generation module 550, which is configured to receive and process the communication mood information. In some embodiments the textual response module 540 is configured to transmit textual response information to the image generation module 550 and the caption generation module 555, each of which is configured to receive and process the textual response information, respectively. In some embodiments the image generation module 550 is configured to transmit image selection information to the caption generation module 555, which is configured to receive and process the image selection information. In some embodiments the caption generation module 555 is configured to transmit caption generation information to the feedback module 560, which is configured to receive and process the caption generation information. In some embodiments the feedback module 560 is configured to transmit feedback information to the storage module 545, which is configured to receive and process the feedback information. In some embodiments the storage module 545 is configured to transmit stored information to image generation module 550, which is configured to receive and process the stored information.

Although separate modules are illustrated in FIG. 5, functionality of one or more modules may be combined, duplicated, or omitted in any suitable configuration. Where parallel functions are illustrated, the functions may be performed in series; where series functions are illustrated, the functions may be performed in parallel. Although the modules of the system 500 are shown as a single system, modules may be integrated into a single device or distributed in any suitable manner. The functionality of the modules may be provided as actively processed, dynamic entities and/or as pre-trained models and the like. In some embodiments, the system 500 includes one or more of the features of system 1700 of FIG. 17.

The user profile and/or user preferences module 505 is set up before an electronic communication commences in some embodiments. The user profile and/or user preferences module 505 updates as memes are generated. The updates are based on user behavior in the communication in some embodiments. The user profile and/or the user preferences of the user profile and/or user preferences module 505 are associated with each user. The user profile includes demographic information such as age, gender, ethnicity, and the like. The user preferences include language type preference, image style preference, caption color preference, and the like. In some embodiments, the user preferences are configurable via the meme generation options menu 300.

In some embodiments, the user profile includes one or more profile images. The profile images are set by the user in some embodiments and/or automatically collected by the system. For example, images from an album of a mobile device of the user are collected. Collection of the images is controlled by the user in some embodiments. Upon granting permission to access the album, the user's photos are automatically collected from the photo album. In some embodiments, images from the album are ranked or sorted. For example, the ranking or sorting is based on frequency of access, frequency of views, a determined likelihood that the image is relevant or interesting to the user and/or a participant in the communication, and the like. In some embodiments, a number of top ranked or sorted images are used to fine-tune a text-to-image model. The fine-tuning ensures a generated image is user specific. In some embodiments, the fine-tuned image has a same or similar facial appearance to that of the user or one of the participants in the communication. In some embodiments, a number of images are selected based on image quality metrics and/or an indication of whether a photo is marked as a favorite in an album or social media account. The number of images is any suitable number, for example, 5. In some embodiments, an image quality metric is a face quality metric.

The communication context module 515 is configured to identify a context of at least a portion the communication. In some embodiments, each context of the communication is identified and tracked, for example, using the database 105. The identified contexts of the communication are associated with a session (e.g., Session ID of the database 105). In some embodiments, the session refers to all communications within a number of minutes, e.g., 5 minutes. In some embodiments, a time gap is used to separate chatting sessions. For example, after 5 minutes of no communication in the communication, the chatting session is reset, e.g., a new Session ID is identified and tracked.

In some embodiments, the context of the communication is determined using a trained language model. The trained language model is configured to determine whether a new topic is started. Once a new topic is started, the chatting session is reset for purposes of meme generation. In some embodiments, each topic is assigned a separate Context ID, e.g., Context 1 ID, Context 2 ID, etc., of the database 105.

In some embodiments, a language model is provided. The language mode is at least one of a recurrent neural network (RNN), a recurrent deep neural network, a long short-term memory (LSTM) model, or the like. For example, the RNN or the LSTM model is configured to accumulate all past chatting information up to a current point in time of the communication now. The accumulated information is modeled by the RNN or the LSTM model as a state vector. The state vector is provided for a context of the communication, in some embodiments.

In some embodiments, the context of the communication includes a relationship between two or more participants in the communication. In some embodiments, live and/or contemporaneous information is utilized. For example, the live information includes at least one of world news, local news, hot and/or trending topics in social media, relatively recent box-office blockbusters, a current date, a current time, a live event (e.g., a sports event, a reality show, a concert event, a gaming event, a weather event, a climate event, a disaster event, an emergency event, a political event, an election event, a socioeconomic event, a war event, an election event, a stock market event, a news event or the like), combinations of the same, or the like. The live and/or contemporaneous information is identified and provided as a context of the communication for meme generation.

In some embodiments, information from the user profile and/or user preferences module 505 and/or the communication context module 515 is input into the decision-making module 510. In some embodiments, information from the communication mood module 535 is provided to the decision-making module 510. The decision-making module 510 is configured, in some embodiments, to automate and/or inform a decision of whether to include a meme. In some embodiments, the decision-making module 510 is configured to determine 520 whether to turn on a meme generation mode. If the determination is negative (520="No"), then the meme generation mode is stopped or disabled 525. If the determination is positive (520="Yes"), then the meme generation mode of the process 500 is started or continued as detailed herein.

The context of the communication is one factor to the decision of whether to utilize meme generation. For example, the expression "I am dying" carries a different meaning in different contexts. Although "I am dying" is literally a negative expression, the phrase has been appropriated in modern, text-based communication parlance. In predictive text systems, the textual term "dead" is associated with a skull emoji and a skull and crossbones emoji. Some users use the term "dead" to express extreme amusement, as in "I'm dying laughing," or a similar positive sentiment. As such, the decision-making module 510 is configured to make the determination based on more than a literal analysis of any given term. A determination of a likely mood or sentiment of the communication is performed in some embodiments. For example, in response to a determination that a likely mood or sentiment of the communication is formal, and/or a determination that the topic, subject, or content of the communication is serious, the decision-making module 510 is configured to turn off the meme generation. In some embodiments, an ML, decision-making model is trained based on text of the communication, context determinations, mood or sentiment determinations, the user profile, and/or the user preferences.

In some embodiments, as shown for example in FIG. 3, the user interface 300 includes one or more selectable controls for the user to manually turn on or turn off the meme generation function. In some embodiments, the chat window 100 of FIG. 1 further includes a switch or a button similar to buttons 310, 315, 320, or the like shown in FIG. 3. As shown in FIG. 3, three states are provided, e.g., the selectable "Always On" button 310, the selectable "Always Off" button 315, and the selectable "Smart Decision" button 320, described herein. In some embodiments, selection of the selectable "Smart Decision" button 320 engages the decision-making module 510.

Information from the user profile and/or user preferences module 505, the decision-making module 510, and/or the communication context module 515 is input into at least one of the communication engine module 530, the communication mood module 535, the textual response module 540, or the like, in some embodiments. At least one of the communication engine module 530, the communication mood module 535, the textual response module 540, or the like utilize autocompletion technology to automatically generate answers in a communication dialogue and/or complete a sentence within the communication. For example, pre-trained natural language processing (NLP) models such as Bidirectional Encoder Representations from Transformers (BERT) and Generative Pre-trained Transformer 3 (GPT-3) are utilized by at least one of the communication engine module 530, the communication mood module 535, the textual response module 540, or the like. In some embodiments, a context is determined not only within a thread of the communication, but across multiple communications, and/or among groups of communications. In some embodiments, the textual response module 540 generates the textual response based on at least one of a context determined from the portion of the communication, an image-to-text process, a user profile, a meme template, combinations of the same, or the like. In some embodiments, the textual response module 540 generates candidates based on all possible combinations of the context determined from the portion of the communication, the image-to-text process, the user profile, or the meme template; ranks the candidates; and selects a number of top-ranked candidates for presentation to the user for possible selection.

Pre-trained large language models are fine-tuned specifically for meme generation in some embodiments. For example, information from the user profile and/or user preferences module 505, and/or the communication context module 515 is provided to the fine-tuned model of the at least one of the communication engine module 530, the communication mood module 535, the textual response module 540, or the like. The fine-tuned model is configured to predict a likely mood or a likely sentiment of the communication as well as automatically provide suggestions for completion of the communication. In order to pre-train the large language model, training data is first collected with real chat communications, user profiles, and user preferences. In some embodiments, a ground-truth mood is manually labeled, or an emotion recognition model is applied to the ground-truth output sentence to label the emotion of the sentence.

In some embodiments, a plurality of C_k outputs are generated by the at least one of the communication engine module 530, the communication mood module 535, the textual response module 540, or the like. For example, the communication engine module 530 is configured to determine C_k pairs of communication moods and autocompleted answers, which are carried forward through the system 500. In some embodiments, determined communication moods are stored in the communication mood module 535, and determined autocompleted answers are stored in the textual response module 540. The determined communication moods and the determined autocompleted answers are, in some embodiments, associated with portions of the database 105, e.g., at least one of the User 1 ID, the User 2 ID, the Session ID, the Context 1 ID, the Context 2 ID, the Meme 1 ID, the Meme 2 ID, the Meme 3 ID, or the like.

In some embodiments, information from the user profile and/or user preferences module 505, the communication mood module 535, the textual response module 540, and/or the storage module 545 is input into the image generation module 550. For example, the automatically generated answers, predicted communication moods, and the user profile and preferences are provided as input to a fine-tuned text-to-image generation model of the image generation module 550 to generate personalized meme images. In some embodiments, a pre-trained diffusion model is configured to generate meme images. The predicted communication moods, the user profiles, and generated answers are entered as a prompt into the pre-trained diffusion model to generate and output meme images. In some embodiments, the pre-trained diffusion model is fine-tuned to generate meme images only. A large dataset of memes with images and captions are provided to the pre-trained diffusion model. Captions from the large dataset of memes are analyzed to generate the communication mood. Also, each image from the large dataset of memes is analyzed and labeled. Additional information from the large dataset of memes is determined in some embodiments. Fine-tuning based on the large dataset of memes is performed to generate a diffusion model to generate meme images in some embodiments. In some embodiments, the image generation module 550 generates the visual response based on at least one of a context determined from the portion of the communication, a text-to-image process, a user profile, a user-provided image, a meme template, combinations of the same, or the like. In some embodiments, the textual response module 540 generates candidates based on all possible combinations of the context determined from the portion of the communication, the text-to-image process, the user profile, the user-provided image, or the meme template; ranks the candidates; and selects a number of top-ranked candidates for presentation to the user for possible selection.

In some embodiments, user profile images are provided to train a fine-tuned meme-generating diffusion model. In some embodiments, a deep learning generation model is utilized. For example, as few as about 2 to about 6 images, 3 to 5 images in some embodiments, result in satisfactory results for the deep learning generation model. As such, the AI-generated meme image has a same look as the user and/or one or more of the participants in the communication.

In some embodiments, a text prompt in the communication is analyzed to determine whether one or more of the participants of the communication is a likely subject for the generated meme. For example, as shown in FIG. 1, the text prompt from the third message 130 from the second user to the first user posing the question "How did you like the movie last night?" is analyzed in this context to determine that "you" likely refers to the first user, and one of the generated candidate memes (e.g., the third meme candidate 180) includes an image based on user profile of the first user.

In some embodiments, a further modification of the generated image is added. For example, a filter is added to the resulting image based on the user preference, or a different shape template is used to modify the generated image. In some embodiments, the above mentioned modification is embedded in the fine-tuned diffusion model, so that the output from the fine-tuned diffusion model will contain the modification directly. In some embodiments, the text-to-image diffusion model generates animated images or looped videos based on the prompt.

For each of the C_k communication moods and autocompleted answers, G_k meme images are generated by the image generation module 550. A number of top ranked or sorted CG_k meme images are input into the caption generation module 555, described herein. For example, CG_k is an integer from 1 to C_k*G_k. Image quality metrics are used to assess the generated image quality from the image generation module 550 and provide the top ranked or sorted CG_k meme images out of the C_k*G_k generated images.

Information from the user profile and/or user preferences module 505, the image generation module 550, and/or the textual response module 540 is input into the caption generation module 555 or the like, in some embodiments. For example, the input to the caption generation module 555 includes the user profile and preferences from the user profile and/or user preferences module 505, the generated meme images from the fine-tuned text-to-image generation model of the image generation module 550, and the autocompleted answers from the at least one of the communication engine module 530, the communication mood module 535, the textual response module 540, or the like. The caption generation model 555 includes, for example, generation of text for the caption, a font for the caption, a location for the caption, a division of the caption into two or more lines for relatively long captions, and the like. In some embodiments, the autocompleted answers are utilized as the caption sentence without further modification. In some embodiments, as shown for example in FIG. 4, when the user types in part of the sentence, the typed-in part is utilized as a first part of the caption, and the auto-completed answer is utilized as a second part.

In some embodiments, the caption generation module 555 includes a deep learning model, which is trained for generating the caption sentence. A large dataset of user profile, meme images, and meme captions is collected to train the deep learning model. In some embodiments, for determining a best font and optimal location for the caption, a font property is determined, which includes a font color, a font size, and a font type. Default settings are provided. Options for user selection of the settings are provided, for example, in the meme generation options menu 300 of FIG. 3. The large dataset of memes is provided in some embodiments with the font type label, which is utilized to predict a font type to use in the generated meme. The font size is calculated based on a length of the caption, and a number of lines needed for the caption. In some embodiments, the font location is selected based on a saliency map of generated images so that the caption covers a least salient part of the image while following default rules. In some embodiments, the saliency map is a deep learning saliency map. For example, the default rules include a margin for a bounding box of the caption leaving at least about a 5% margin. The font color is selected based on at least one of a preset color, a complimentary color based on a dominant color tone of the meme image, combinations of the same, or the like. The dominant color tone of the meme image is obtained by generating a color tone histogram of the image, for example.

The caption generation module 555 is configured to analyze a large set of generated memes in some embodiments. The large set is ranked by a meme ranking model. The meme ranking model analyzes the generated meme based on image quality, caption quality, and suitability for the communication. A number of the highest ranked memes are presented to the user for selection as noted herein.

As noted herein, in some embodiments, three meme images are generated for presentation to the user including one based on the template model (e.g., the first meme candidate 160), another based on the text-to-image model (e.g., the second meme candidate 170), and another based on the user profile model (e.g., the third meme candidate 180), as shown in the generated meme selection field 150 of the chat window 100 of FIG. 1. However, the examples provided herein are not limited to that illustrated.

In some embodiments, candidate memes are generated and presented to the user based on a memes database stored in the storage module 545. Selection based on the memes database relies on an association between inputs and memes. The inputs include, for example, the user profile and preferences, the communication mood, and the autocompleted answers. In the example of FIG. 5, an image part of the meme is selected from the meme database of the storage module 545, and new captions are generated with the caption generation module 555. In some embodiments, selection is made by the system 500 from previously generated and selected memes stored in the meme database of the storage module 545 and associated with identifying information (e.g., the database 105). As such, in some embodiments, meme generation is based on a previously generated image and caption, without a need for a new cycle of image and caption generation and associated details. That is, in some embodiments, the generated memes are stored in the meme database for reuse. The feedback module 560 is configured to prompt the user to mark a particular meme as a favorite. The meme marked as a favorite provides information to the system 500 so that the favorite meme has a higher probability of being presented as a candidate for selection in the future under similar circumstances (e.g., the communication has the same or similar context, mood, sentiment, topic, users, and the like).

Within the communication, in some embodiments, the system 500 provides an option for the user to continue to provide automatically generated memes after sending one out (e.g., after selection of the selectable "Always On" button 310), or the system 500 may be configured to monitor the communication for a reply or a new topic (e.g., after selection of the selectable "Smart Decision" button 320).

Although examples are provided with meme generation as an object, the system 500 is provided, in some embodiments, to generate enhanced output using similar functionality to that disclosed herein. The enhanced output includes at least one of a meme, an animated image, an animated GIF, an emoji, an avatar, combinations of the same, or the like. That is, automatic, contemporaneous, in-line generation of enhanced content is provided. Although examples are provided with reference to a chat window (e.g., FIG. 1), applications other than chatting are provided. For example, the system 500 is provided, in some embodiments, for posting in a social network thread, such as tweets in Twitter, or as part of an online discussion forum. The system 500 is configured for use in any type of communication where context and user preferences, for example, are used to generate candidate content for user selection.

Regardless of whether the system 500 outputs a meme, an emoji, a GIF, or the like, the system 500 is configured to monitor a context across multiple communications that are exchanged between two or more users (or by a single user generating a post for consumption by one or more others). The system 500 includes, in some embodiments, use of at least the session ID and/or the context ID associated with a message or a portion of the message ensures appropriate content, is easy-to-use, and facilitates user satisfaction. The context of the on-going communication is analyzed. For example, the communication is at least one of text-based, audio-based, a combination of the same, or the like. In some embodiments, the communication includes communications based on audio message exchanges. When appropriate, enhanced output is recommended. In some embodiments, the system 500 accesses previous messages that were exchanged (e.g., messages sent during the last minute) to determine the context (e.g., by relying on trained language models). Context IDs are reset as users switch topics, end communications, and the like. In some embodiments, a positive sentiment or a negative sentiment is determined, and enhanced content is suggested if the sentiment is positive, and disabled or deemphasized if the sentiment is negative or inappropriate.

Figure 6:
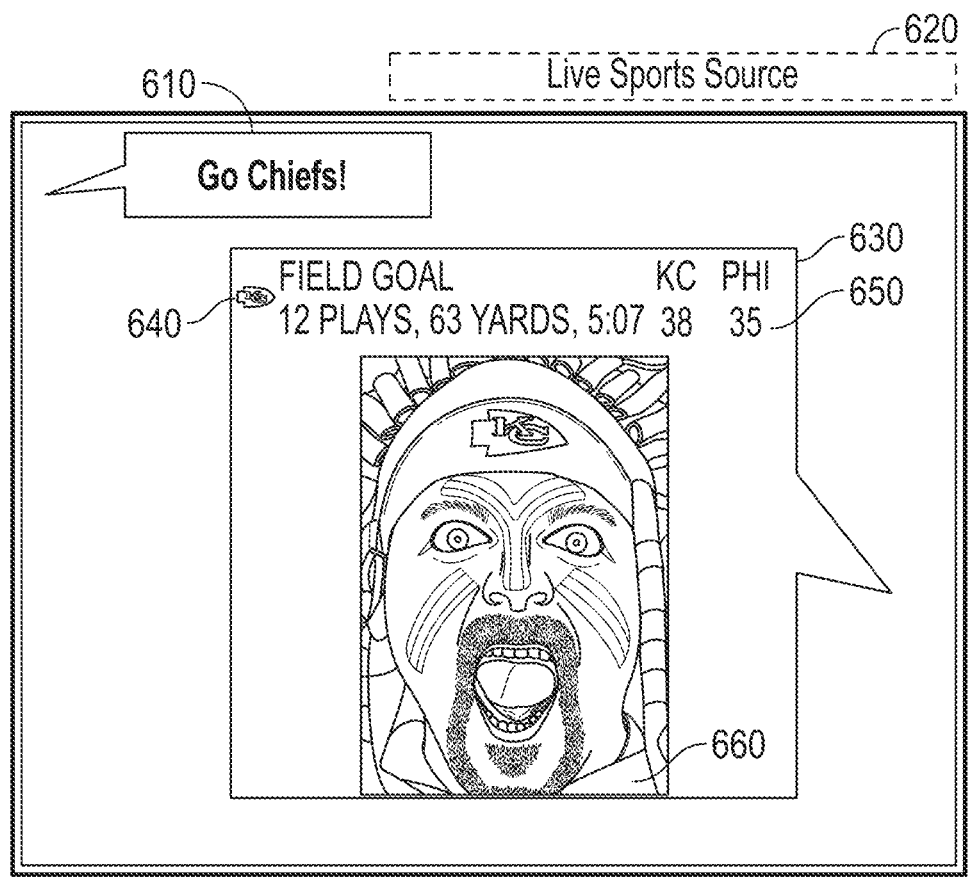
FIG. 6 depicts another chat window after selection of a sports-themed meme based on text entered by a user with the generated meme including an image of the user, in accordance with some embodiments of the disclosure.

In some embodiments, enhanced output is recommended to the user (i.e., a meme is generated for presentation before the user has typed a reply) if the reply is known or is reasonably predicted. For example, a meme is generated when the messaging context is related to live sports, e.g., an on-going football game. For example, if the context of the message relates to a live football game, then the memes are generated based on such live event in near real-time based on the context of the messages (e.g., after a field goal is made or a pass is intercepted). Similarly, the real-time score of the game is used if the context of the message relates to such. For example, in an example drawn from Super Bowl LVII, as shown in FIG. 6, receipt of a message 610 such as "Go Chiefs" during Super Bowl LVII results in a generation and suggestion of at least one responsive meme 630 that depicts the user with information 640 about a live game (e.g., the Kansas City Chiefs logo, the text "FIELD GOAL", details of the most recent scoring drive, e.g., "12 PLAYS, 66 YARDS, 5:07" (i.e., the number of plays, the number of yards gained, and the duration of the drive), and the like), the real-time score 650 (e.g., "KC 38" and "PHI 35"), and an image 660 of the user (e.g., the user wearing Chiefs paraphernalia and team-themed makeup). The meme 630 includes the user's facial expression to reflect the determined mood of the communication. The information 640 and the score 650 is retrieved from a live sports source 620, such as a sports application programming interface (API) feed.

Figure 7:
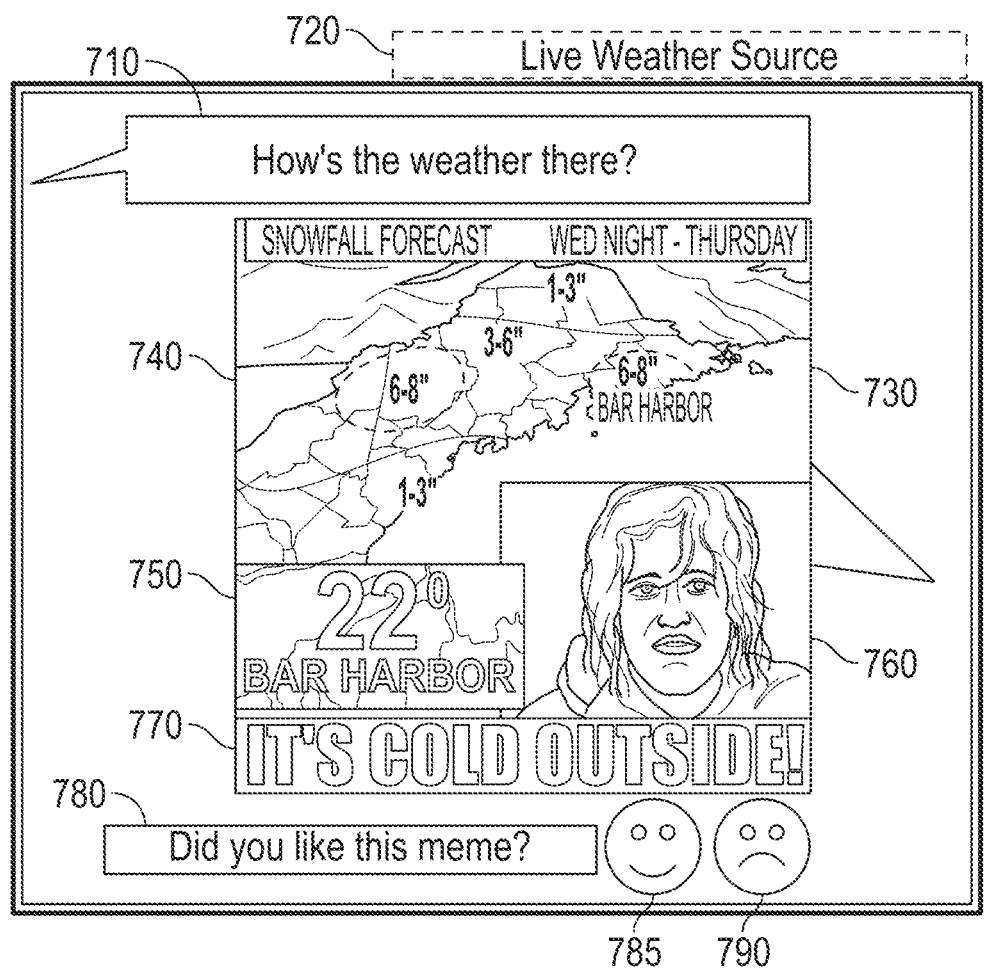
FIG. 7 depicts still another chat window after selection of a weather-themed meme based on text entered by a user, and a feedback mechanism, in accordance with some embodiments of the disclosure.
Figure 8:
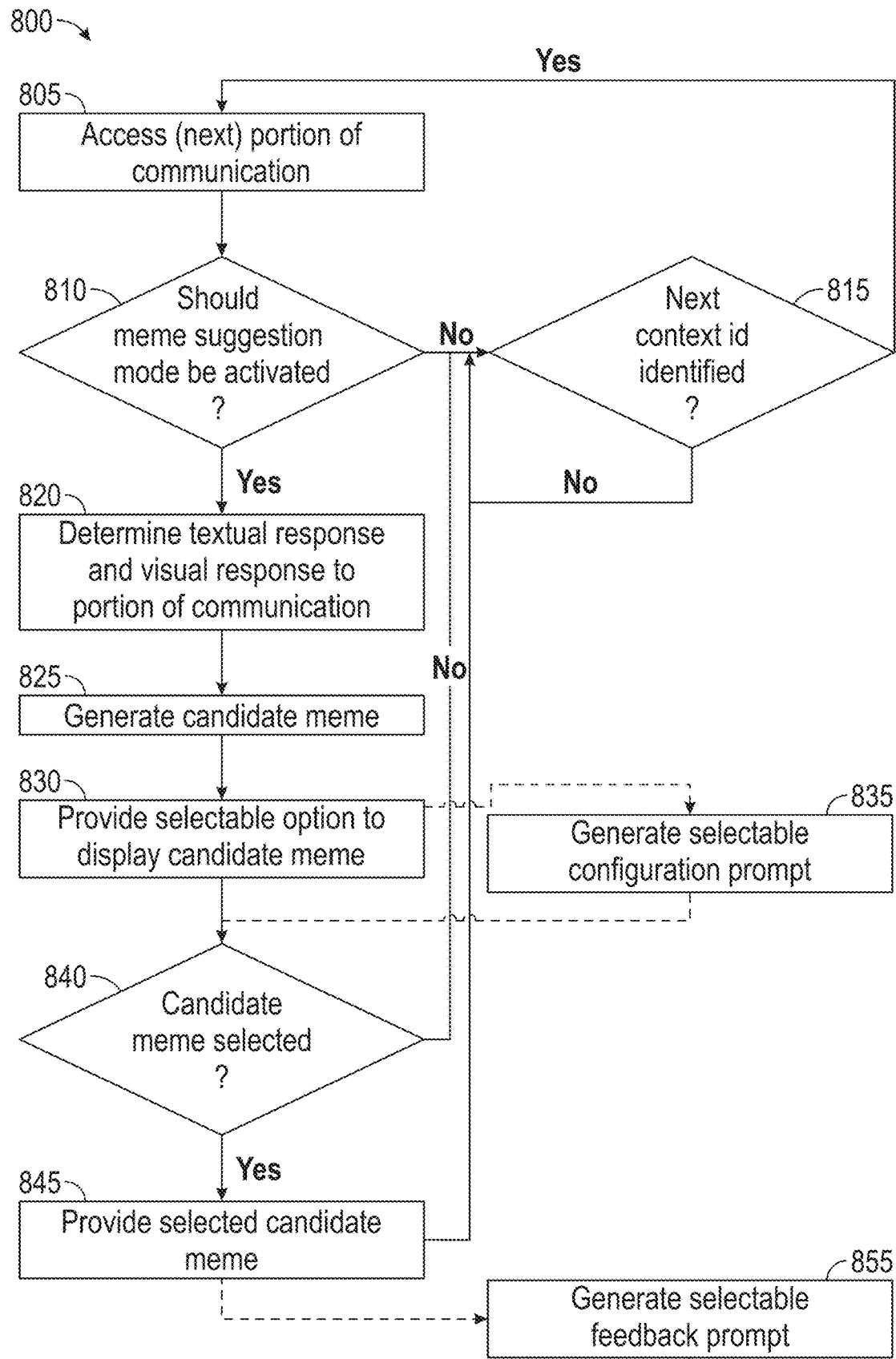
FIG. 8 depicts a process for generating meme suggestions, in accordance with some embodiments of the disclosure.
Figure 9:
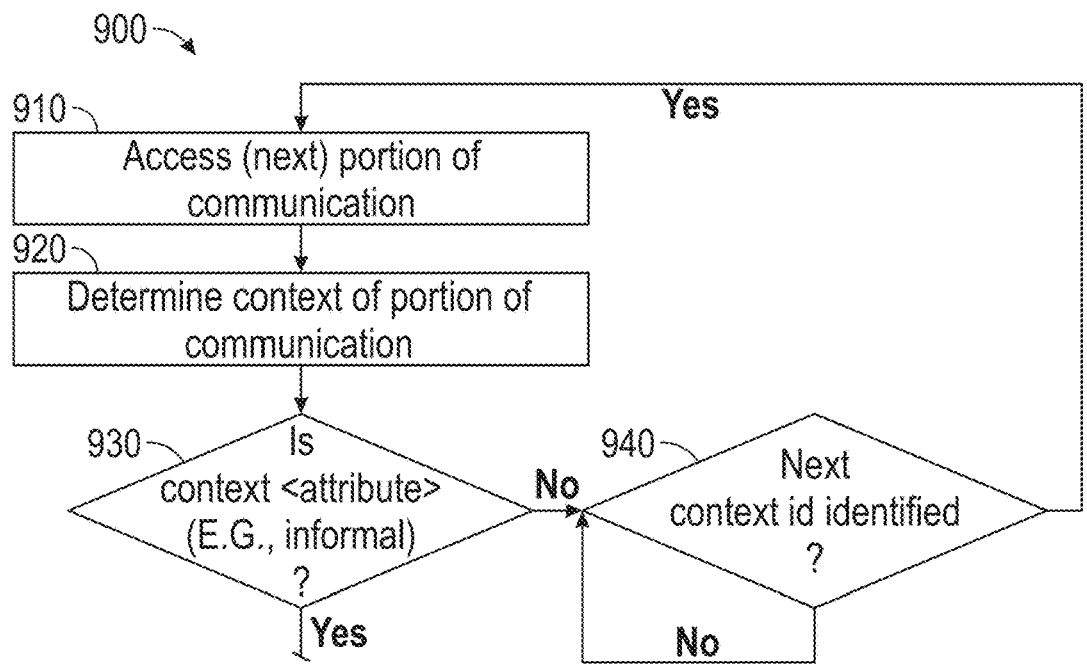
FIG. 9 depicts a process for determining and analyzing a context of an electronic communication, in accordance with some embodiments of the disclosure.
Figure 10:
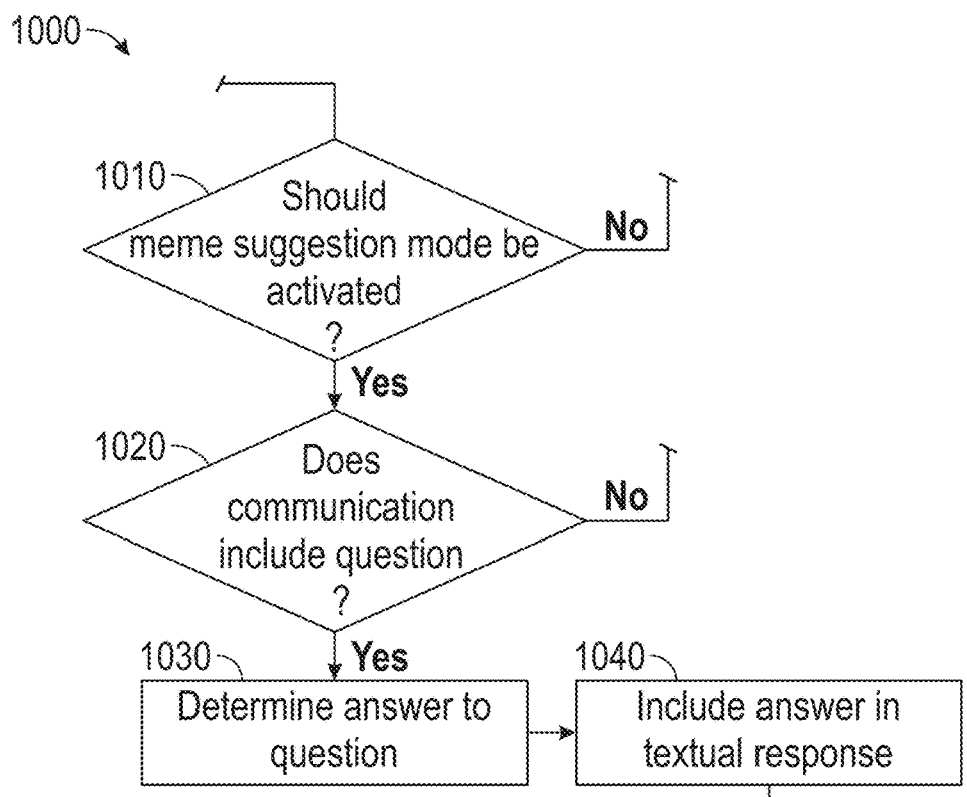
FIG. 10 depicts a process for generating a meme with an answer to a question presented during an electronic communication, in accordance with some embodiments of the disclosure.
Figure 11:
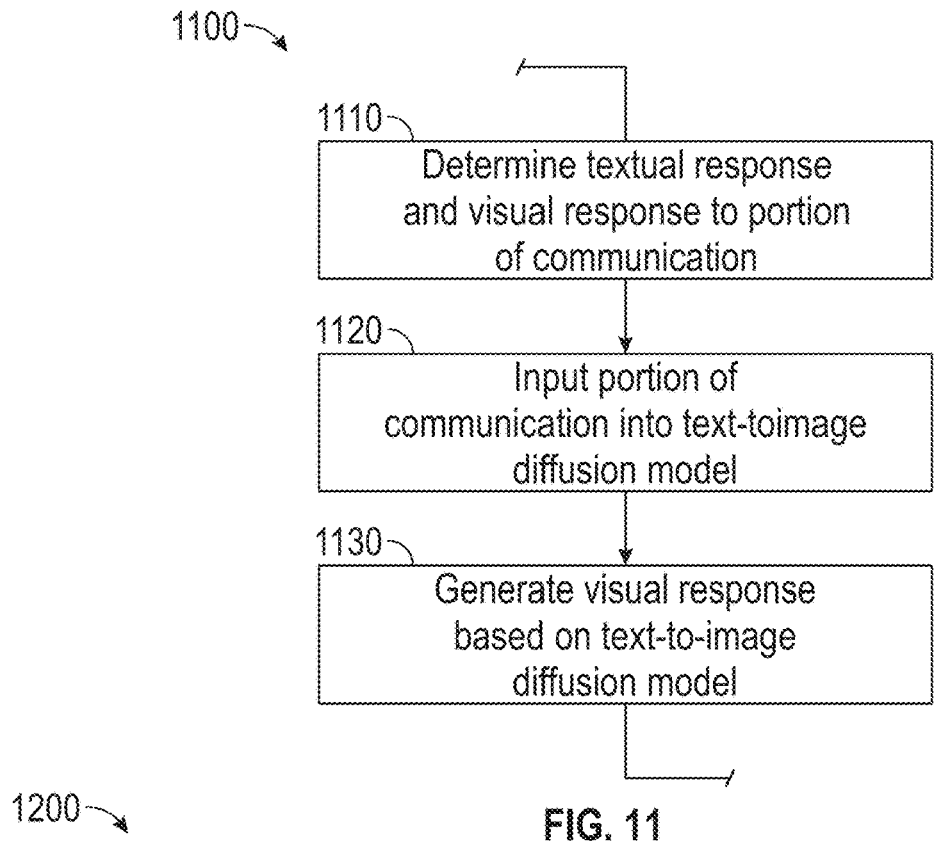
FIG. 11 depicts a process for generating an image for a meme using a text-to-image diffusion model and for generating meme suggestions, in accordance with some embodiments of the disclosure.
Figure 12:
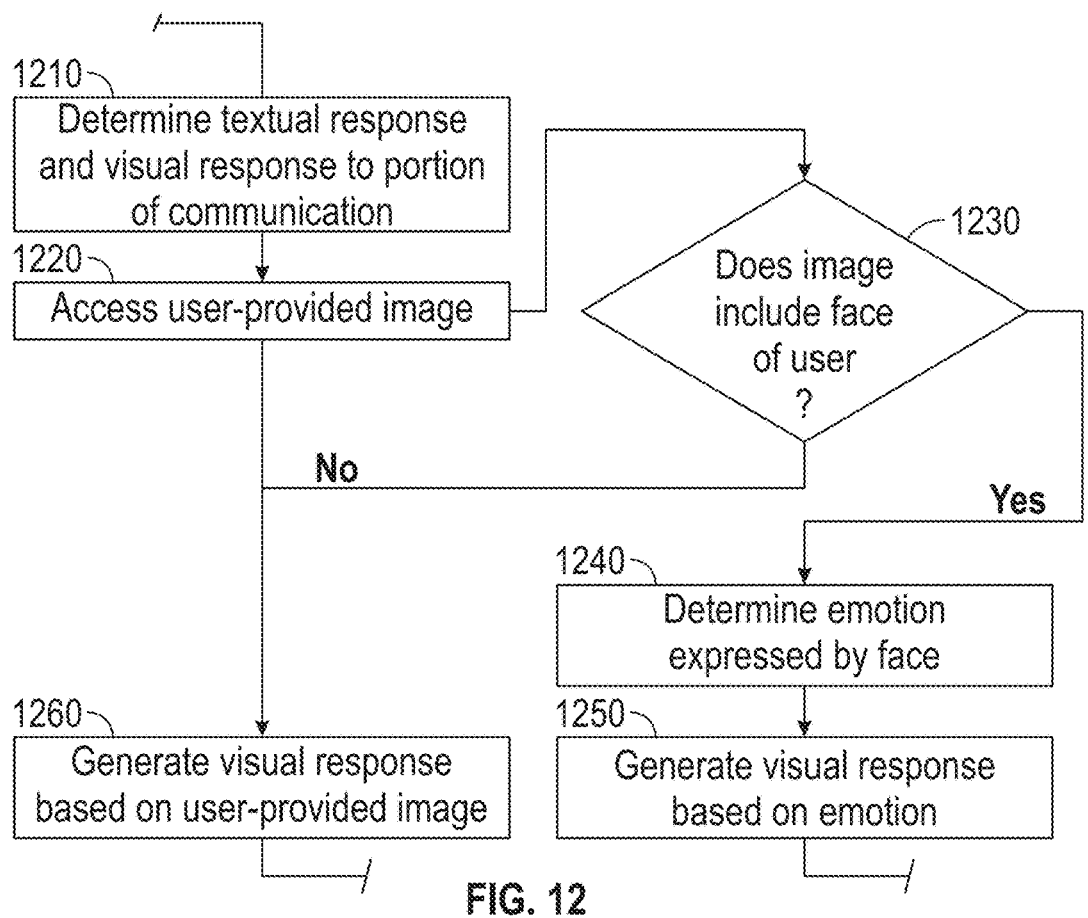
FIG. 12 depicts a process for accessing a user-provided image, recognizing a face in the image, and determining an emotion expressed by the face and for generating meme suggestions, in accordance with some embodiments of the disclosure.
Figure 13:
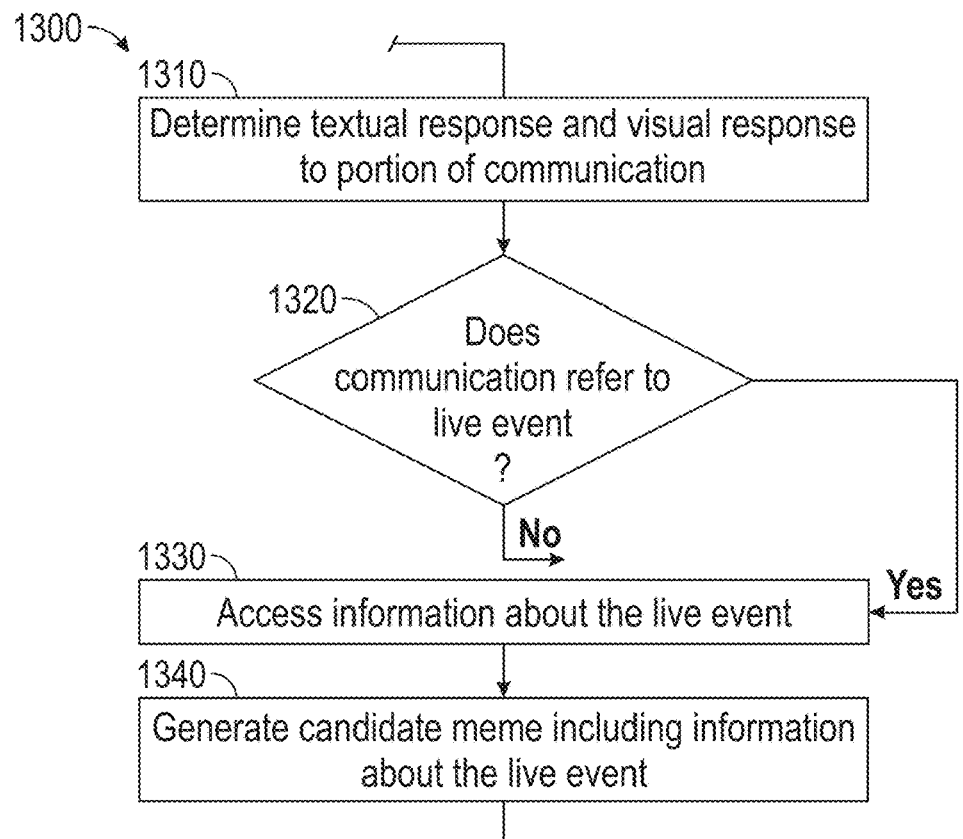
FIG. 13 depicts a process for determining whether an electronic communication includes a live event and for generating meme suggestions, in accordance with some embodiments of the disclosure.
Figure 14:
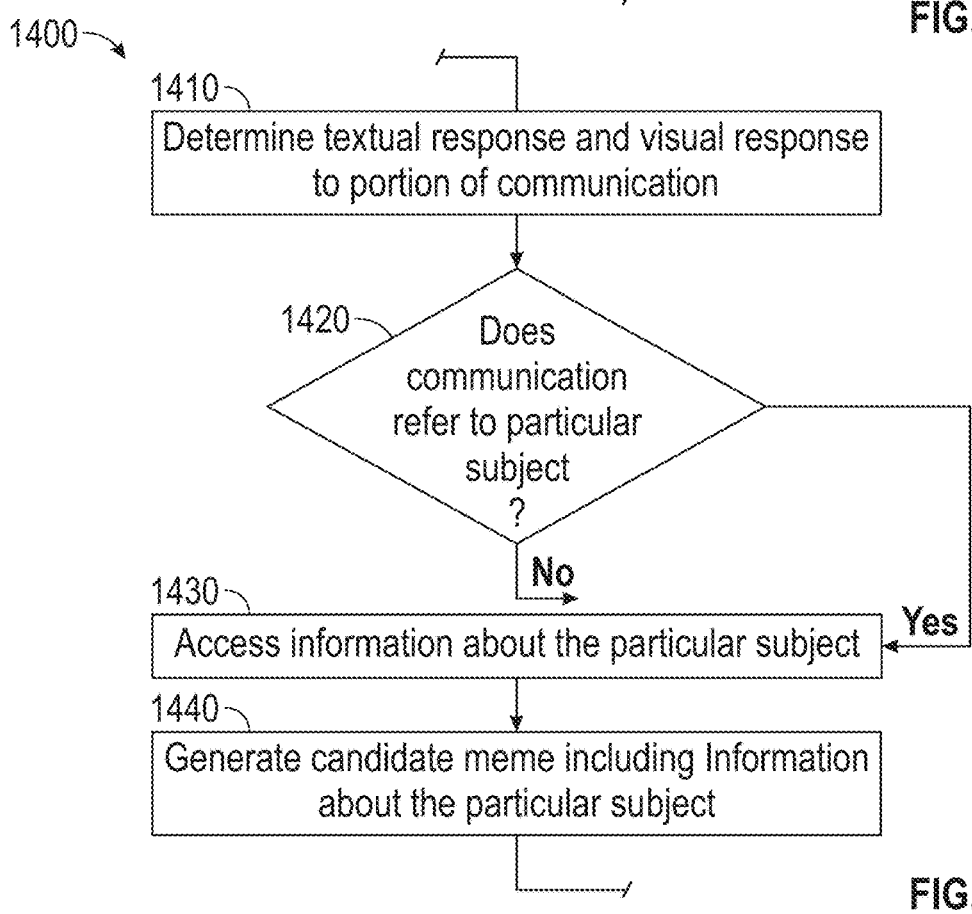
FIG. 14 depicts a process for determining whether an electronic communication includes a particular subject and for generating meme suggestions, in accordance with some embodiments of the disclosure.
Figure 15:
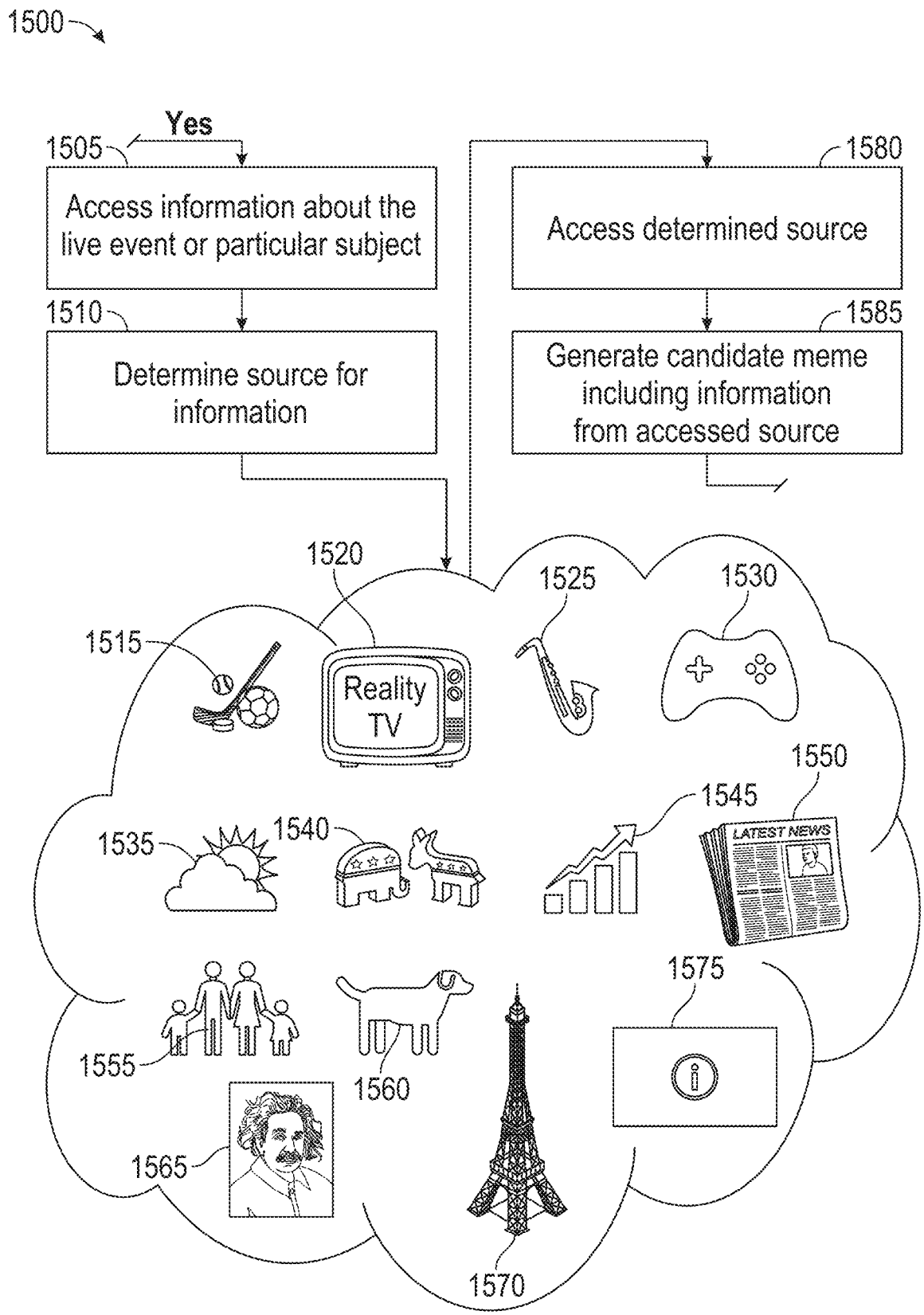
FIG. 15 depicts a process for determining and accessing a source of information and for generating meme suggestions, in accordance with some embodiments of the disclosure.

As shown in FIG. 7, if the first user receives a text message 710 such as "How's the weather there?" from the second user, then the system 500, which is integrated with or accessed by a messaging application (e.g., iMessage, WhatsApp, Instagram, and the like), automatically generates a responsive weather meme 730, which is customized with real-time weather data based on the first user's location. In some embodiments, the communication engine module 535 is configured to query in real-time a weather API or obtain weather data directly from a weather application installed on the recipient's phone. Weather information is retrieved from a live weather source 720, such as a weather API feed. For example, the responsive weather meme 730 includes at least one of a weather map 740 (e.g., a map of Maine and surrounding areas) based on the recipient user's location, a live temperature and location 750 (e.g., "22°" and "Bar Harbor") based on current weather information and the recipient user's location, a highly rated or popular weather meme image 760 (e.g., Jon Snow played by Kit Harrington), and a weather meme caption 780 (e.g., "IT'S COLD OUTSIDE!"). In some embodiments, the weather meme image 760 is an animated GIF. In some embodiments, the chat window includes a feedback prompt 780 (e.g., "Did you like this meme?"), which is presented to the user below display of the responsive weather meme 730. The feedback prompt 780 includes, in this example, a positive feedback response option 785 (e.g., a happy face) and a negative feedback response option 790 (e.g., a sad face). Feedback from the feedback prompt 780 is provided to the feedback module 560 and associated with the generated, selected, and rated meme in some embodiments.

In some embodiments, meme generation integrates with NLP modules and APIs (e.g., weather, sports scores, news, and the like) for customization and personalization. For example, the communication engine module 530 queries other APIs for answers (e.g., weather, scores, news, and the like), and data from the APIs forms a portion or entirety of a prompt input into the text-to-image model of the image generation module 550.

Existing text-to-image diffusion models and/or models generated in accordance with the present disclosure are provided to generate a meme of a subject in a context of an electronic communication. In some embodiments, the text input to the model is automatically generated. The user is prompted to train the model during a registration process in some embodiments. For example, while giving a meme generation application access to messaging application data, the user is prompted to supply images of themselves with an angry face, a confused face, a happy face, and the like. Such pictures are captured in real-time during the registration process in some embodiments. The real-time image acquisition is used in lieu of or in addition to giving the application access to the user's photo libraries. In addition to providing static images as output, the output of the model includes multiple images played in sequence to generate an animated GIF in some embodiments. In order to fine-tune the text-to-image model so that at least some generated memes depict the user with various facial expressions, user's photos are provided (e.g., the user's favorite pictures on one or more social media websites, on the user's phone, and the like). For example, when the user's photo library includes pictures of their dog, dog memes are provided with images based on the user's own dog.

In some embodiments, pictures are marked private or public, which results in operation of the system 500 in a private mode or a public mode. In the private mode, key visual features extracted from user provided pictures remain associated with memes generated for that particular user. The user's photos and associated metadata enable the model to identify classes of subjects available from the user's personal content (e.g., humans, dogs, cars, relatives, parents, and the like), which are used by the model as appropriate.

The system 500 and any of its components may include one or more meme generation processes depicted, for example, in FIGS. 8-15. In some embodiments, a process 800 for generating meme suggestions is provided. In some embodiments, the process 800 includes at least one of a process 900 for determining and analyzing a context of an electronic communication, a process 1000 for generating a meme with an answer to a question presented during an electronic communication, a process 1100 for generating an image for a meme using a text-to-image diffusion model and for generating meme suggestions, a process 1200 for accessing a user-provided image, recognizing a face in the image, and determining an emotion expressed by the face and for generating meme suggestions, a process 1300 for determining whether an electronic communication includes a live event and for generating meme suggestions, a process 1400 for determining whether an electronic communication includes a particular subject and for generating meme suggestions, or a process 1500 for determining and accessing a source of information and for generating meme suggestions.

Each of the processes 800-1500 may be standalone or integrate into a larger process. Although separate processes are illustrated in FIGS. 8-15, functionality of one or more processes may be combined, duplicated, or omitted in any suitable configuration. Where parallel processes are illustrated, the processes may be performed in series; where series processes are illustrated, the processes may be performed in parallel. Although the some processes are shown as a single process, processes may be integrated into a single process on a single device or distributed in any suitable manner. The processes may be actively processed, and/or models may be pre-trained to include one or more processes disclosed herein.

For example, the system 500 is configured to access 805 a portion of an electronic communication. If the process 800 occurs after completion of a previous iteration or a reset operation, the access 805 is made to a next portion of the communication. The system 500 is configured to determine 810 whether a meme suggestion mode should be activated. In response to determining that the meme suggestion mode should be activated (810="Yes"), the process 800 continues to step 820. In response to determining that the meme suggestion mode should not be activated (810="No"), the process 800 continues to step 815. The system 500 is configured to determine 815 whether a next context ID is identified. In response to determining that the next context ID is identified (815="Yes"), the process 800 continues to step 805. In response to determining that the next context ID is not identified (815="No"), step 815 repeats until the next context ID is identified. In some embodiments, the system 500 is configured to monitor the communication for a change in a topic or an end of the communication, which results in determining that the next context ID is identified (815="Yes"). In some embodiments, in response to detecting the change in the topic or the end of the communication, the system 500 is configured to reset parameters of the meme suggestion mode for a next topic or a next communication.

The system 500 is configured to determine 820 a textual response and a visual response to the portion of the communication. The system 500 is configured to generate 825 a candidate meme. The candidate meme includes an image including the textual response and the visual response in some embodiments. The step 825 includes generation of any of the generation methods and types of memes disclosed herein and the like. The system 500 is configured to provide 830 for display as part of the communication a selectable option including display of the candidate meme. The system 500 is configured to determine 840 whether the candidate meme is selected. In response to selection of the selectable option (840="Yes"), the system 500 is configured to provide 845 the candidate meme for display within the communication. In some circumstances, the providing 845 of the candidate meme for display occurs before receiving a response to a last received text in the communication, as shown in the example of FIG. 1. In other circumstances, the providing 845 of the candidate meme for display occurs while receiving a response to a last received text in the communication, as shown in the example of FIG. 4. If no selection of the candidate meme is made (840="No"), the system 500 is configured to revert to step 815. For example, as shown in FIG. 1, the system 500 is configured to generate 835 a selectable configuration prompt, such as the configuration button 195. For example, as shown in FIG. 7, the system 500 is configured to generate 855 a selectable feedback prompt, such as the feedback prompt 780, the positive feedback response option 785, and the negative feedback response option 790.

The system 500 is configured to determine 810 whether a meme suggestion mode should be activated based on the communication. In the "Always On" mode, step 810 is set to "Yes," and step 815 is omitted in some embodiments. That is, in the "Always On" mode, memes are continuously generated in response to each input text, for example. In the "Always Off" mode, the entire process 800 is disabled. In the "Smart Decision" mode, in order to determine 810 whether the meme suggestion mode should be activated, any of the decision-making modules and processes disclosed herein is provided.

In the "Smart Decision" mode, at least one of a context, a mood, a tone, a sentiment, an emotion, combinations of the same, or the like that is definitively or likely expressed in the communication is determined. For example, in the "Smart Decision" mode, determination of a positive, humorous, informal, and/or light-hearted context results in activation of the meme suggestion mode (810="Yes"). Whereas, determination of a negative, serious, formal, and/or heavy-hearted context results in deactivation of the meme suggestion mode (810="No"). For example, according to the process 900, the system 500 is configured to access 910 a portion of an electronic communication. If the process 900 occurs after completion of a previous iteration or a reset operation, the access 910 is made to a next portion of the communication. The system is configured to determine 920 at least one of a context, a mood, a tone, a sentiment, an emotion, combinations of the same, or the like that is definitively or likely expressed in the communication. The system 500 is configured to determine whether the determined context, mood, tone, sentiment, emotion, or the like is or is likely to be associated with an attribute. For example, positivity is generally associated with emotions such as amusement, awe, contentment, happiness, interest, joy, love, satisfaction, serenity, and the like; whereas, negativity is generally associated with emotions such as anger, annoyance, disgust, fear, loneliness, melancholy, rage, sadness, and the like. Detection of a predominance of one or more positive emotions results in continuation of the meme generation mode (930="Yes"); whereas, detection of a predominance of one or more negative emotions results in discontinuation of the meme generation mode (930="No"). In some embodiments, the system 500 is configured to determine 940 whether a next context ID is identified before proceeding with other processes.

When multiple emotions are expressed in the communication or a portion thereof, a weighted average is determined in some embodiments. In some embodiments and in some contexts, expression of predominantly negative emotions overrides expressions of positive emotions or vice-versa. For example, identification of certain negative subjects, e.g., a funeral of a family member of one of the users engaged in the communication, results in disabling of the meme generation mode. After the disabling of the meme generation mode, a cooling off period is provided for a set time and/or until detection of a generally or predominantly positive overall mood. To ensure nuance in the decision-making, the identification of negative subjects is balanced against a contextual analysis in some embodiments. For instance, if users are engaged in a communication about a movie depicting a funeral while also determining that an overall mood of the communication is generally or predominantly positive, then the meme generation mode is enabled.

In some embodiments, in response to determining the meme suggestion mode should be activated (810="Yes"), the system 500 is configured to execute the determining 820, the generating 825, the providing 830 of the selectable option, and the providing 845 of the candidate meme in response to the selection of the selectable option. In other embodiments, even when it is determined that the meme suggestion mode should not be activated (810="No"), the system 500 is configured to execute some processes, e.g., the determining 820 and the generating 825 steps, in a background or parallel processing mode and without presenting candidate memes to the user, which may be utilized at a later point in the communication.

In some embodiments, the process 1000 is activated when a question is present in the communication. The system 500 is configured to determine 1010 whether the meme suggestion mode should be activated. In response to determining the meme suggestion mode should be activated (1010="Yes"), the system 500 is configured to determine 1020 whether the communication includes a question. In some embodiments, detection of a question mark ("?") or inclusion of an open-ended statement in the communication affirmatively indicates presence of a question. In response to determining the communication includes the question (1020="Yes"), the system 500 is configured to determine 1030 an answer to the question and include 1040 the answer in the textual response.

In some embodiments, the system 500 is configured to determine 1110 a textual response and a visual response to a portion of the communication. The system 500 is configured to input 1120 the portion of the communication into a text-to-image diffusion model. The system 500 is configured to generate 1130 the visual response based on the text-to-image diffusion model, which is configured for generating meme images.

In some embodiments, the system 500 is configured to determine 1210 a textual response and a visual response to a portion of the communication. The system 500 is configured to access 1220 a user-provided image. In some embodiments, the system 500 is configured to determine 1220 whether the user-provided image includes a face of the user.

In response to determining the user-provided image does not include the face of the user (1230="No"), the process 1200 proceeds to generate 1260 the visual response based on the user-provided image. In some embodiments, in response to determining the user-provided image includes the face of the user (1230="Yes"), the process 1200 proceeds to determine 1240 an emotion expressed by the face and generate 1250 the visual response based on the emotion. In some embodiments, steps 1230, 1240, and 1250 are omitted, and the visual response is based on the user-provided image. In some embodiments, the emotion expressed in the user-provided image is modified to match the determined context of the communication.

In some embodiments, the system 500 is configured to determine 1310 a textual response and a visual response to a portion of the communication. The system 500 is configured to determine 1320 whether the communication refers to a live event. In response to determining the communication refers to the live event (1320="Yes"): the system 500 is configured to access 1330 information about the live event and generate 1340 the candidate meme including the information about the live event.

In some embodiments, the system 500 is configured to determine 1410 a textual response and a visual response to a portion of the communication. The system 500 is configured to determine 1420 whether the communication refers to a particular subject. In response to determining the communication refers to the particular subject (1420="Yes"), the system 500 is configured to access 1430 information about the particular subject and generate 1440 the candidate meme including the information about the particular subject.

In some embodiments, the system 500 is configured to access 1505 information about the live event or the particular subject. The system 500 is configured to determine 1510 a source for the information. The system 500 is configured to access 1580 the determined source. The system 500 is configured to generate 1585 the candidate meme including the information from the accessed source.

Sources for the information are provided online or from any suitable data storage. As noted with the examples of FIGS. 6 and 7, the source of information may be an API for a particular type of information, particularly for live events. The sources for the information include at least one of sports event information 1515 (see, the example of FIG. 6), reality show information 1520, concert event information 1525, gaming event information 1530, weather event information 1535 (see, the example of FIG. 7), political event information 1540, stock market event information 1545, news event information 1550, information 1555 about a family member of a participant in the communication, information 1560 about a pet of the participant in the communication, celebrity information 1565 (e.g., a politician or a famous person such as Albert Einstein), famous place information 1570 (e.g., the Eiffel Tower), famous object information (e.g., the Hope Diamond), a consumer product (e.g., a shoe for sale), general information 1575 (e.g., an encyclopedia or dictionary), or the like. Some types of information are particular to memes such as so-called "first world problems," a change of mind, an achievement, a particular expression, a tagline, a catch phrase, a need to spend an amount of money, an emotion, an escalation of a sentiment, an omniscient perspective, hyperbole, a disaster, a decision between two or more options, any subject of a popular meme, combinations of the same, or the like.

In some embodiments, meme images and captions are generated based on a conversation context, user profiles, and user preferences. For example, a method, system, and non-transitory computer-readable medium for determining whether a message should be prevented from being sent to an unintended recipient are described in U.S. patent application Ser. No. 16/407,347, filed May 9, 2019, to Harijan et al. The '347 application is hereby incorporated by reference herein in its entirety. In some embodiments, the system 500 and process 800 includes one or more features of the '347 application.

In some embodiments, a relationship between parties in a chat forms a basis for generating content. For example, a method, system, and non-transitory computer-readable medium for utilizing personal graphic elements in electronic communication are described in U.S. patent application Ser. No. 18/215,676, filed Jun. 28, 2023, to Xu et al. The '676 application is hereby incorporated by reference herein in its entirety. In some embodiments, the system 500 and process 800 includes one or more features of the '676 application.

Predictive Model

Figure 16:
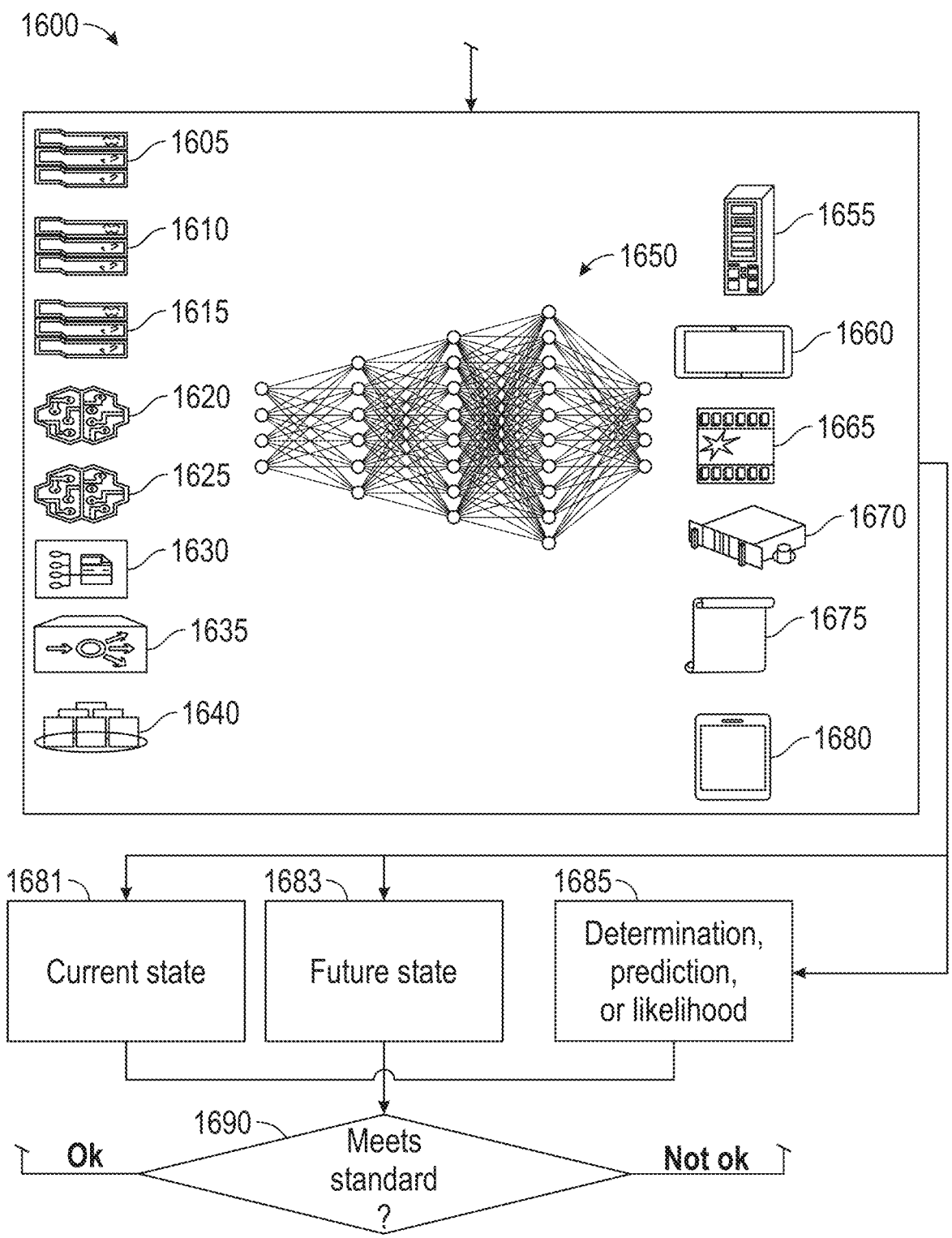
FIG. 16 depicts an artificial intelligence system for generating meme suggestions, in accordance with some embodiments of the disclosure.

Throughout the present disclosure, in some embodiments, determinations, predictions, likelihoods, and the like are determined with one or more predictive models. For example, FIG. 16 depicts a predictive model. A prediction process 1600 includes a predictive model 1650 in some embodiments. The predictive model 1650 receives as input various forms of data about one, more or all the users, media content items, devices, and data described in the present disclosure. The predictive model 1650 performs analysis based on at least one of hard rules, learning rules, hard models, learning models, usage data, load data, analytics of the same, metadata, or profile information, and the like. The predictive model 1650 outputs one or more predictions of a future state of any of the devices described in the present disclosure. A load-increasing event is determined by load-balancing processes, e.g., least connection, least bandwidth, round robin, server response time, weighted versions of the same, resource-based processes, and address hashing. The predictive model 1650 is based on input including at least one of a hard rule 1605, a user-defined rule 1610, a rule defined by a content provider 1615, a hard model 1620, or a learning model 1625.

The predictive model 1650 receives as input usage data 1630. The predictive model 1650 is based, in some embodiments, on at least one of a usage pattern of the user or media device, a usage pattern of the requesting media device, a usage pattern of the media content item, a usage pattern of the communication system or network, a usage pattern of the profile, or a usage pattern of the media device.

The predictive model 1650 receives as input load-balancing data 1635. The predictive model 1650 is based on at least one of load data of the display device, load data of the requesting media device, load data of the media content item, load data of the communication system or network, load data of the profile, or load data of the media device.

The predictive model 1650 receives as input metadata 1640. The predictive model 1650 is based on at least one of metadata of the streaming service, metadata of the requesting media device, metadata of the media content item, metadata of the communication system or network, metadata of the profile, or metadata of the media device. The metadata includes information of the type represented in the media device manifest.

The predictive model 1650 is trained with data. The training data is developed in some embodiments using one or more data processes including but not limited to data selection, data sourcing, and data synthesis. The predictive model 1650 is trained in some embodiments with one or more analytical processes including but not limited to classification and regression trees (CART), discrete choice models, linear regression models, logistic regression, logit versus probit, multinomial logistic regression, multivariate adaptive regression splines, probit regression, regression processes, survival or duration analysis, and time series models. The predictive model 1650 is trained in some embodiments with one or more machine learning approaches including but not limited to supervised learning, unsupervised learning, semi-supervised learning, reinforcement learning, and dimensionality reduction. The predictive model 1650 in some embodiments includes regression analysis including analysis of variance (ANOVA), linear regression, logistic regression, ridge regression, and/or time series. The predictive model 1650 in some embodiments includes classification analysis including decision trees and/or neural networks. In FIG. 16, a depiction of a multi-layer neural network is provided as a non-limiting example of a predictive model 1650, the neural network including an input layer (left side), three hidden layers (middle), and an output layer (right side) with 32 neurons and 192 edges, which is intended to be illustrative, not limiting. The predictive model 1650 is based on data engineering and/or modeling processes. The data engineering processes include exploration, cleaning, normalizing, feature engineering, and scaling. The modeling processes include model selection, training, evaluation, and tuning. The predictive model 1650 is operationalized using registration, deployment, monitoring, and/or retraining processes.

The predictive model 1640 is configured to output results to a device or multiple devices. The device includes means for performing one, more, or all the features referenced herein of the systems, methods, processes, and outputs of one or more of FIGS. 1-15, in any suitable combination. The device is at least one of a server 1655, a tablet 1660, a media display device 1665, a network-connected computer 1670, a media device 1675, a computing device 1680, or the like.

The predictive model 1650 is configured to output a current state 1681, and/or a future state 1683, and/or a determination, a prediction, or a likelihood 1685, and the like. The current state 1681, and/or the future state 1683, and/or the determination, the prediction, or the likelihood 1685, and the like may be compared 1690 to a predetermined or determined standard. In some embodiments, the standard is satisfied (1490=OK) or rejected (1490=NOT OK). If the standard is satisfied or rejected, the predictive process 1600 outputs at least one of the current state, the future state, the determination, the prediction, or the likelihood to any device or module disclosed herein.

Communication System

Figure 17:
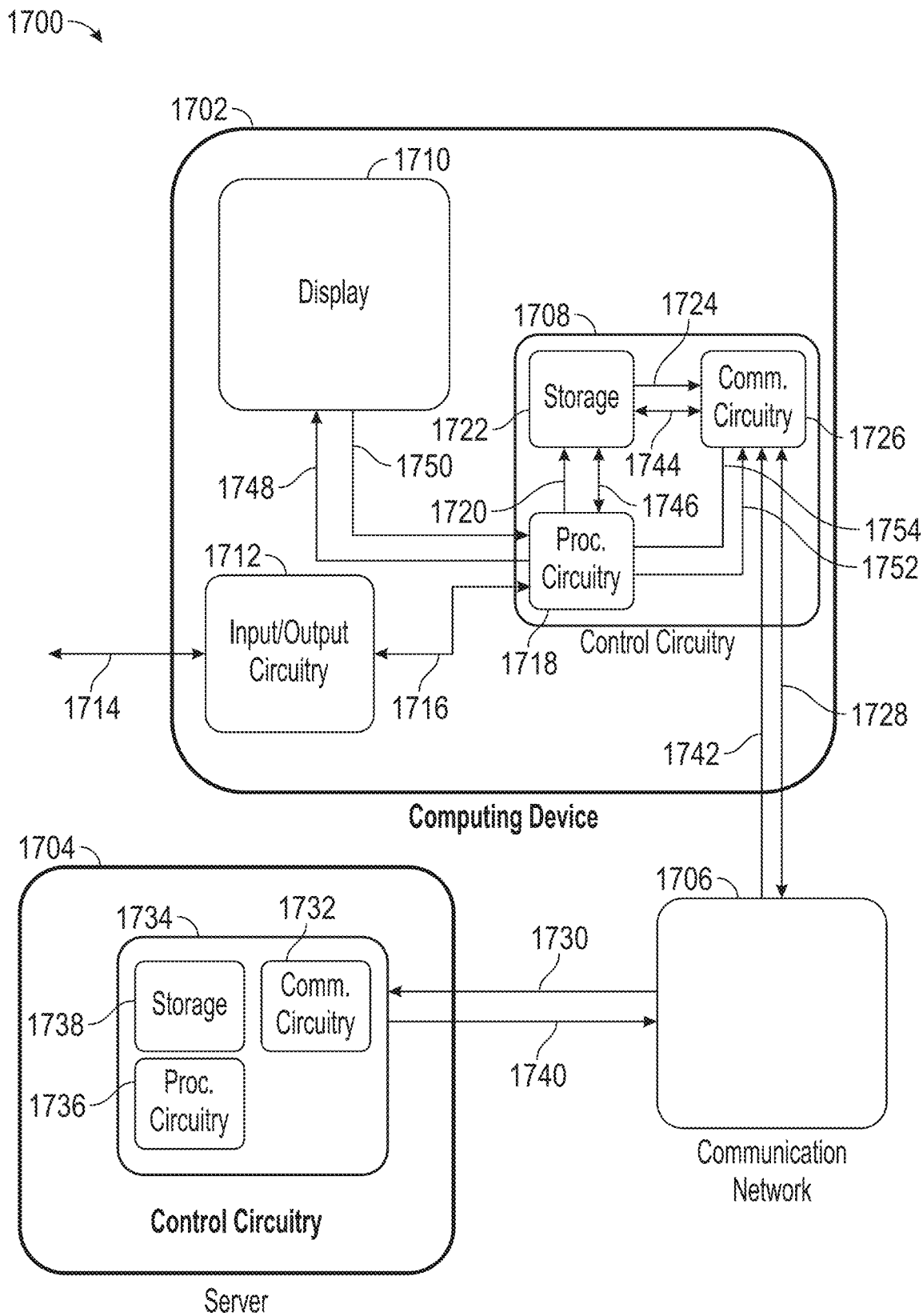
FIG. 17 depicts a system including a server, a communication network, and a computing device for performing the methods and processes noted herein, in accordance with some embodiments of the disclosure.

FIG. 17 depicts a block diagram of system 1700, in accordance with some embodiments. The system is shown to include computing device 1702, server 1704, and a communication network 1706. It is understood that while a single instance of a component may be shown and described relative to FIG. 17, additional embodiments of the component may be employed. For example, server 1704 may include, or may be incorporated in, more than one server. Similarly, communication network 1706 may include, or may be incorporated in, more than one communication network. Server 1704 is shown communicatively coupled to computing device 1702 through communication network 1706. While not shown in FIG. 17, server 1704 may be directly communicatively coupled to computing device 1702, for example, in a system absent or bypassing communication network 1706.

Communication network 1706 may include one or more network systems, such as, without limitation, the Internet, LAN, Wi-Fi, wireless, or other network systems suitable for audio processing applications. The system 1700 of FIG. 17 excludes server 1704, and functionality that would otherwise be implemented by server 1704 is instead implemented by other components of the system depicted by FIG. 17, such as one or more components of communication network 1706. In still other embodiments, server 1704 works in conjunction with one or more components of communication network 1706 to implement certain functionality described herein in a distributed or cooperative manner. Similarly, the system depicted by FIG. 17 excludes computing device 1702, and functionality that would otherwise be implemented by computing device 1702 is instead implemented by other components of the system depicted by FIG. 17, such as one or more components of communication network 1706 or server 1704 or a combination of the same. In other embodiments, computing device 1702 works in conjunction with one or more components of communication network 1706 or server 1704 to implement certain functionality described herein in a distributed or cooperative manner.

Computing device 1702 includes control circuitry 1708, display 1710 and input/output (I/O) circuitry 1712. Control circuitry 1708 may be based on any suitable processing circuitry and includes control circuits and memory circuits, which may be disposed on a single integrated circuit or may be discrete components. As referred to herein, processing circuitry should be understood to mean circuitry based on at least one microprocessors, microcontrollers, digital signal processors, programmable logic devices, field-programmable gate arrays (FPGAs), or application-specific integrated circuits (ASICs), and the like, and may include a multi-core processor (e.g., dual-core, quad-core, hexa-core, or any suitable number of cores). In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). Some control circuits may be implemented in hardware, firmware, or software.

Control circuitry 1708 in turn includes communication circuitry 1726, storage 1722 and processing circuitry 1718. Either of control circuitry 1708 and 1734 may be utilized to execute or perform any or all the systems, methods, processes, and outputs of one or more of FIGS. 1-16, or any combination of steps thereof (e.g., as enabled by processing circuitries 1718 and 1736, respectively).

In addition to control circuitry 1708 and 1734, computing device 1702 and server 1704 may each include storage (storage 1722, and storage 1738, respectively). Each of storages 1722 and 1738 may be an electronic storage device. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 8D disc recorders, digital video recorders (DVRs, sometimes called personal video recorders, or PVRs), solid state devices, quantum storage devices, gaming consoles, gaming media, or any other suitable fixed or removable storage devices, and/or any combination of the same. Each of storage 1722 and 1738 may be used to store several types of content, metadata, and/or other types of data. Non-volatile memory may also be used (e.g., to launch a boot-up routine and other instructions). Cloud-based storage may be used to supplement storages 1722 and 1738 or instead of storages 1722 and 1738. In some embodiments, a user profile and messages corresponding to a chain of communication may be stored in one or more of storages 1722 and 1738. Each of storages 1722 and 1738 may be utilized to store commands, for example, such that when each of processing circuitries 1718 and 1736, respectively, are prompted through control circuitries 1708 and 1734, respectively. Either of processing circuitries 1718 or 1736 may execute any of the systems, methods, processes, and outputs of one or more of FIGS. 1-16, or any combination of steps thereof.

In some embodiments, control circuitry 1708 and/or 1734 executes instructions for an application stored in memory (e.g., storage 1722 and/or storage 1738). Specifically, control circuitry 1708 and/or 1734 may be instructed by the application to perform the functions discussed herein. In some embodiments, any action performed by control circuitry 1708 and/or 1734 may be based on instructions received from the application. For example, the application may be implemented as software or a set of and/or one or more executable instructions that may be stored in storage 1722 and/or 1738 and executed by control circuitry 1708 and/or 1734. The application may be a client/server application where only a client application resides on computing device 1702, and a server application resides on server 1704.

The application may be implemented using any suitable architecture. For example, it may be a stand-alone application wholly implemented on computing device 1702. In such an approach, instructions for the application are stored locally (e.g., in storage 1722), and data for use by the application is downloaded on a periodic basis (e.g., from an out-of-band feed, from an Internet resource, or using another suitable approach). Control circuitry 1708 may retrieve instructions for the application from storage 1722 and process the instructions to perform the functionality described herein. Based on the processed instructions, control circuitry 1708 may determine a type of action to perform in response to input received from I/O circuitry 1712 or from communication network 1706.

In client/server-based embodiments, control circuitry 1708 may include communication circuitry suitable for communicating with an application server (e.g., server 1704) or other networks or servers. The instructions for conducting the functionality described herein may be stored on the application server. Communication circuitry may include a cable modem, an Ethernet card, or a wireless modem for communication with other equipment, or any other suitable communication circuitry. Such communication may involve the Internet or any other suitable communication networks or paths (e.g., communication network 1706). In another example of a client/server-based application, control circuitry 1708 runs a web browser that interprets web pages provided by a remote server (e.g., server 1704). For example, the remote server may store the instructions for the application in a storage device.

The remote server may process the stored instructions using circuitry (e.g., control circuitry 1734) and/or generate displays. Computing device 1702 may receive the displays generated by the remote server and may display the content of the displays locally via display 1710. For example, display 1710 may be utilized to present a string of characters. This way, the processing of the instructions is performed remotely (e.g., by server 1704) while the resulting displays, such as the display windows described elsewhere herein, are provided locally on computing device 1704. Computing device 1702 may receive inputs from the user via input/output circuitry 1712 and transmit those inputs to the remote server for processing and generating the corresponding displays.

Alternatively, computing device 1702 may receive inputs from the user via input/output circuitry 1712 and process and display the received inputs locally, by control circuitry 1708 and display 1710, respectively. For example, input/output circuitry 1712 may correspond to a keyboard and/or a set of and/or one or more speakers/microphones which are used to receive user inputs (e.g., input as displayed in a search bar or a display of FIG. 17 on a computing device). Input/output circuitry 1712 may also correspond to a communication link between display 1710 and control circuitry 1708 such that display 1710 updates in response to inputs received via input/output circuitry 1712 (e.g., simultaneously update what is shown in display 1710 based on inputs received by generating corresponding outputs based on instructions stored in memory via a non-transitory, computer-readable medium).

Server 1704 and computing device 1702 may transmit and receive content and data such as media content via communication network 1706. For example, server 1704 may be a media content provider, and computing device 1702 may be a smart television configured to download or stream media content, such as a live news broadcast, from server 1704. Control circuitry 1734, 1708 may send and receive commands, requests, and other suitable data through communication network 1706 using communication circuitry 1732, 1726, respectively. Alternatively, control circuitry 1734, 1708 may communicate directly with each other using communication circuitry 1732, 1726, respectively, avoiding communication network 1706.

It is understood that computing device 1702 is not limited to the embodiments and methods shown and described herein. In nonlimiting examples, computing device 1702 may be a television, a Smart TV, a set-top box, an integrated receiver decoder (TRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a handheld computer, a stationary telephone, a personal digital assistant (PDA), a mobile telephone, a portable video player, a portable music player, a portable gaming machine, a smartphone, or any other device, computing equipment, or wireless device, and/or combination of the same, capable of suitably displaying and manipulating media content.

Computing device 1702 receives user input 1714 at input/output circuitry 1712. For example, computing device 1702 may receive a user input such as a user swipe or user touch. It is understood that computing device 1702 is not limited to the embodiments and methods shown and described herein.

User input 1714 may be received from a user selection-capturing interface that is separate from device 1702, such as a remote-control device, trackpad, or any other suitable user movement-sensitive, audio-sensitive or capture devices, or as part of device 1702, such as a touchscreen of display 1710. Transmission of user input 1714 to computing device 1702 may be accomplished using a wired connection, such as an audio cable, USB cable, ethernet cable and the like attached to a corresponding input port at a local device, or may be accomplished using a wireless connection, such as Bluetooth, Wi-Fi, WiMAX, GSM, UTMS, CDMA, TDMA, 8G, 4G, 4G LTE, 5G, or any other suitable wireless transmission protocol. Input/output circuitry 1712 may include a physical input port such as a 12.5 mm (0.4921 inch) audio jack, RCA audio jack, USB port, ethernet port, or any other suitable connection for receiving audio over a wired connection or may include a wireless receiver configured to receive data via Bluetooth, Wi-Fi, WiMAX, GSM, UTMS, CDMA, TDMA, 3G, 4G, 4G LTE, 5G, or other wireless transmission protocols.

Processing circuitry 1718 may receive user input 1714 from input/output circuitry 1712 using communication path 1716. Processing circuitry 1718 may convert or translate the received user input 1714 that may be in the form of audio data, visual data, gestures, or movement to digital signals. In some embodiments, input/output circuitry 1712 performs the translation to digital signals. In some embodiments, processing circuitry 1718 (or processing circuitry 1736, as the case may be) conducts disclosed processes and methods.

Processing circuitry 1718 may provide requests to storage 1722 by communication path 1720. Storage 1722 may provide requested information to processing circuitry 1718 by communication path 1746. Storage 1722 may transfer a request for information to communication circuitry 1726 which may translate or encode the request for information to a format receivable by communication network 1706 before transferring the request for information by communication path 1728. Communication network 1706 may forward the translated or encoded request for information to communication circuitry 1732, by communication path 1730.

At communication circuitry 1732, the translated or encoded request for information, received through communication path 1730, is translated or decoded for processing circuitry 1736, which will provide a response to the request for information based on information available through control circuitry 1734 or storage 1738, or a combination thereof. The response to the request for information is then provided back to communication network 1706 by communication path 1740 in an encoded or translated format such that communication network 1706 forwards the encoded or translated response back to communication circuitry 1726 by communication path 1742.

At communication circuitry 1726, the encoded or translated response to the request for information may be provided directly back to processing circuitry 1718 by communication path 1754 or may be provided to storage 1722 through communication path 1744, which then provides the information to processing circuitry 1718 by communication path 1746. Processing circuitry 1718 may also provide a request for information directly to communication circuitry 1726 through communication path 1752, where storage 1722 responds to an information request (provided through communication path 1720 or 1744) by communication path 1724 or 1746 that storage 1722 does not contain information pertaining to the request from processing circuitry 1718.

Processing circuitry 1718 may process the response to the request received through communication paths 1746 or 1754 and may provide instructions to display 1710 for a notification to be provided to the users through communication path 1748. Display 1710 may incorporate a timer for providing the notification or may rely on inputs through input/output circuitry 1712 from the user, which are forwarded through processing circuitry 1718 through communication path 1748, to determine how long or in what format to provide the notification. When display 1710 determines the display has been completed, a notification may be provided to processing circuitry 1718 through communication path 1750.

The communication paths provided in FIG. 17 between computing device 1702, server 1704, communication network 1706, and all subcomponents depicted are examples and may be modified to reduce processing time or enhance processing capabilities for each step in the processes disclosed herein by one skilled in the art.

Terminology

The terminology used herein is for the purpose of describing particular embodiments only and is not intended to be limiting of the disclosure.

Throughout the specification the terms "communication," "electronic communication," "online communication" and the like are provided. It is understood that the communication is at least one of an electronic communication, an online communication, an online chat, instant messaging, an iMessage, an electronic conversation, a group chat, a text message, an internet forum, an online message board, an email, a blog, an online article, a comments or posting section of a website (including a social media website), an offline communication, a voice message, a voicemail, combinations of the same, or the like. For instance, in some embodiments, the communication is a companion chat window and/or communication application for livestreaming video, such as YouTube, Zoom, Twitch, and the like. The communication may be text-based or audio-based. In some embodiments, for an audio-based communication, a speech-to-text module converts the audio to text for processing. The communication includes at least one of raw data from the communication, text, an entirety of a communication session, a session identifier, a context identifier, a user profile, a user preference, a user-provided image, an image of a face of a user engaged in the communication, an audio file, a recording, a transcription, a portion of the same, a combination of the same, or the like.

As used herein, the terms "real-time," "simultaneous," "substantially on-demand," and the like are understood to be nearly instantaneous but may include delay due to practical limits of the system. Such delays may be on the order of milliseconds or microseconds, depending on the application and nature of the processing. Relatively longer delays (e.g., greater than a millisecond) may result due to communication or processing delays, particularly in remote and cloud computing environments.

As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Although at least some embodiments are described as using a plurality of units or modules to perform a process or processes, it is understood that the process or processes may also be performed by one or a plurality of units or modules. Additionally, it is understood that the term controller/control unit may refer to a hardware device that includes a memory and a processor. The memory may be configured to store the units or the modules, and the processor may be specifically configured to execute said units or modules to perform one or more processes which are described herein.

Unless specifically stated or obvious from context, as used herein, the term "about" is understood as within a range of normal tolerance in the art, for example within 2 standard deviations of the mean. "About" may be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

The use of the terms "first", "second", "third", and so on, herein, are provided to identify structures or operations, without describing an order of structures or operations, and, to the extent the structures or operations are used in an embodiment, the structures may be provided or the operations may be executed in a different order from the stated order unless a specific order is definitely specified in the context.

The methods and/or any instructions for performing any of the embodiments discussed herein may be encoded on computer-readable media. Computer-readable media includes any media capable of storing data. The computer-readable media may be transitory, including, but not limited to, propagating electrical or electromagnetic signals, or may be non-transitory (e.g., a non-transitory, computer-readable medium accessible by an application via control or processing circuitry from storage) including, but not limited to, volatile and non-volatile computer memory or storage devices such as a hard disk, floppy disk, USB drive, DVD, CD, media cards, register memory, processor caches, random access memory (RAM), and the like.

The interfaces, processes, and analysis described may, in some embodiments, be performed by an application. The application may be loaded directly onto each device of any of the systems described or may be stored in a remote server or any memory and processing circuitry accessible to each device in the system. The generation of interfaces and analysis there-behind may be performed at a receiving device, a sending device, or some device or processor therebetween.

The systems and processes discussed herein are intended to be illustrative and not limiting. One skilled in the art would appreciate that the actions of the processes discussed herein may be omitted, modified, combined, and/or rearranged, and any additional actions may be performed without departing from the scope of the invention. More generally, the disclosure herein is meant to provide examples and is not limiting. Only the claims that follow are meant to set bounds as to what the present disclosure includes. Furthermore, it should be noted that the features and limitations described in any some embodiments may be applied to any other embodiment herein, and flowcharts or examples relating to some embodiments may be combined with any other embodiment in a suitable manner, done in different orders, or done in parallel. In addition, the methods and systems described herein may be performed in real-time. It should also be noted that the methods and/or systems described herein may be applied to, or used in accordance with, other methods and/or systems.

This specification discloses embodiments, which include, but are not limited to, the following items:

Item 1. A method comprising:
  accessing a portion of an electronic communication;
  determining a textual response and a visual response to the portion of the electronic communication;
  generating a candidate meme comprising an image including the textual response and the visual response;
  providing for display as part of the electronic communication a selectable option including display of the candidate meme; and
  in response to selection of the selectable option, providing the candidate meme for display within the electronic communication.

Item 2. The method of item 1, comprising: determining whether a meme suggestion mode should be activated based on the electronic communication.

Item 3. The method of item 2, comprising:
  in response to determining the meme suggestion mode should be activated, executing the determining, the generating, the providing of the selectable option, and the providing the candidate meme in response to the selection of the selectable option.

Item 4. The method of item 2, wherein the determining whether the meme suggestion mode should be activated based on the electronic communication includes determining whether a selectable control for enabling the meme suggestion mode is selected.

Item 5. The method of item 4, wherein the selectable control for enabling the meme suggestion mode includes generating for display a selectable switch or a selectable button in the electronic communication.

Item 6. The method of item 4, wherein the selectable control for enabling the meme suggestion mode includes an always on mode, an always off mode, and a smart decision mode.

Item 7. The method of item 1, wherein the accessing the portion of the electronic communication includes determining a context of the portion of the electronic communication.

Item 8. The method of item 7, comprising:
  in response to determining the context of the portion of the electronic communication is informal, activating the meme suggestion mode.

Item 9. The method of item 1, wherein the textual response is based on at least one of a context determined from the portion of the electronic communication, an image-to-text process, a user profile, or a meme template.

Item 10. The method of item 2, comprising:
  in response to determining the meme suggestion mode should be activated:
  determining whether the electronic communication includes a question; and
  in response to determining the electronic communication includes the question:
  determining an answer to the question; and
  including the answer in the textual response.

Item 11. The method of item 1, wherein the visual response is based on a text-to-image diffusion model configured for generating meme images.

Item 12. The method of item 1, wherein the visual response is based on at least one of a context determined from the portion of the electronic communication, a text-to-image process, a user profile, a user-provided image, or a meme template.

Item 13. The method of item 1, comprising:
  determining an emotion expressed in the portion of the electronic communication, wherein the visual response is based on the emotion.

Item 14. The method of item 2, comprising:
  monitoring the electronic communication for a change in a topic or an end of the electronic communication; and
  in response to detecting the change in the topic or the end of the communication, resetting parameters of the meme suggestion mode for a next topic or a next communication.

Item 15. The method of item 1, comprising:
  determining whether the electronic communication refers to a live event; and
  in response to determining the electronic communication refers to the live event:
  accessing information about the live event,
  wherein the generating the candidate meme includes the information about the live event.

Item 16. The method of item 15, wherein the live event is at least one of a sports event, a reality show, a concert event, a gaming event, a weather event, a climate event, a disaster event, an emergency event, a political event, an election event, a socioeconomic event, a war event, an election event, a stock market event, a news event, a military event, a cultural event, or a community event.

Item 17. The method of item 1, comprising:
  determining whether the electronic communication refers to a particular subject; and
  in response to determining the electronic communication refers to the particular subject:
  accessing information about the particular subject,
  wherein the generating the candidate meme includes the information about the particular subject, and
  wherein the particular subject is at least one of a family member of a participant in the electronic communication, a pet of the participant in the electronic communication, a celebrity, a politician, a famous person, a famous place, a famous object, a first world problem, a consumer product, a change of mind, an achievement, a particular expression, a tagline, a catch phrase, a need to spend an amount of money, an emotion, an escalation of a sentiment, an omniscient perspective, hyperbole, a disaster, a decision between two or more options, or a subject of a popular meme.

Item 18. The method of item 1, wherein the providing for display occurs before receiving a response to a last received text in the electronic communication.

Item 19. The method of item 1, wherein the electronic communication is at least one of an electronic chat, a text message, an internet forum, an electronic message board, an email, a blog, an electronic article, or a comments section of a website, and
  wherein the electronic communication includes at least one of text, a session identifier, a context identifier, a user profile, a user preference, a user-provided image, or an image of a face of a user engaged in the electronic communication.

Item 20. The method of item 1, comprising:
  training a model to perform the accessing, the determining the textual response and the visual response, and the generating the candidate meme.

Item 21. A system comprising:
  circuitry configured to:
  access a portion of an electronic communication;
  determine a textual response and a visual response to the portion of the electronic communication;
  generate a candidate meme comprising an image including the textual response and the visual response;
  provide for display as part of the electronic communication a selectable option including display of the candidate meme; and
  in response to selection of the selectable option, provide the candidate meme for display within the electronic communication.

Item 22. The system of item 21, wherein the circuitry is configured to: determine whether a meme suggestion mode should be activated based on the electronic communication.

Item 23. The system of item 22, wherein the circuitry is configured to:
  in response to determining the meme suggestion mode should be activated, execute the determining, the generating, the providing of the selectable option, and the providing the candidate meme in response to the selection of the selectable option.

Item 24. The system of item 22, wherein the circuitry configured to determine whether the meme suggestion mode should be activated based on the electronic communication is configured to determine whether a selectable control for enabling the meme suggestion mode is selected.

Item 25. The system of item 24, wherein the circuitry is configured to:
  generate for display the selectable control for enabling the meme suggestion mode, and
  generate for display a selectable switch or a selectable button in the electronic communication.

Item 26. The system of item 24, wherein the circuitry is configured to:
  generate for display the selectable control including an always on mode, an always off mode, and a smart decision mode.

Item 27. The system of item 21, wherein the circuitry configured to access the portion of the electronic communication is configured to determine a context of the portion of the electronic communication.

Item 28. The system of item 27, wherein the circuitry is configured to:
  in response to determining the context of the portion of the electronic communication is informal, activate the meme suggestion mode.

Item 29. The system of item 21, wherein the circuitry is configured to:
  generate the textual response based on at least one of a context determined from the portion of the electronic communication, an image-to-text process, a user profile, or a meme template.

Item 30. The system of item 22, wherein the circuitry is configured to:
  in response to determining the meme suggestion mode should be activated:
  determine whether the electronic communication includes a question; and
  in response to determining the electronic communication includes the question:
  determine an answer to the question; and
  include the answer in the textual response.

Item 31. The system of item 21, wherein the circuitry is configured to: generate the visual response based on a text-to-image diffusion model configured for generating meme images.

Item 32. The system of item 21, wherein the circuitry is configured to:
  generate the visual response based on at least one of a context determined from the portion of the electronic communication, a text-to-image process, a user profile, a user-provided image, or a meme template.

Item 33. The system of item 21, wherein the circuitry is configured to:
  determine an emotion expressed in the portion of the electronic communication; and
  generate the visual response based on the emotion.

Item 34. The system of item 22, wherein the circuitry is configured to:
  monitor the electronic communication for a change in a topic or an end of the electronic communication; and in response to detecting the change in the topic or the end of the communication, reset parameters of the meme suggestion mode for a next topic or a next communication.

Item 35. The system of item 21, wherein the circuitry is configured to:
determine whether the electronic communication refers to a live event; and
in response to determining the electronic communication refers to the live event:
access information about the live event; and
generate the candidate meme based on the information about the live event.

Item 36. The system of item 35, wherein the live event is at least one of a sports event, a reality show, a concert event, a gaming event, a weather event, a climate event, a disaster event, an emergency event, a political event, an election event, a socioeconomic event, a war event, an election event, a stock market event, a news event, a military event, a cultural event, or a community event.

Item 37. The system of item 21, wherein the circuitry is configured to:
determine whether the electronic communication refers to a particular subject; and
in response to determining the electronic communication refers to the particular subject:
access information about the particular subject; and
generate the candidate meme based on the information about the particular subject, wherein the particular subject is at least one of a family member of a participant in the electronic communication, a pet of the participant in the electronic communication, a celebrity, a politician, a famous person, a famous place, a famous object, a first world problem, a consumer product, a change of mind, an achievement, a particular expression, a tagline, a catch phrase, a need to spend an amount of money, an emotion, an escalation of a sentiment, an omniscient perspective, hyperbole, a disaster, a decision between two or more options, or a subject of a popular meme.

Item 38. The system of item 21, wherein the providing for display occurs before receiving a response to a last received text in the electronic communication.

Item 39. The system of item 21, wherein the electronic communication is at least one of an electronic chat, a text message, an internet forum, an electronic message board, an email, a blog, an electronic article, or a comments section of a website, and
wherein the electronic communication includes at least one of text, a session identifier, a context identifier, a user profile, a user preference, a user-provided image, or an image of a face of a user engaged in the electronic communication.

Item 40. The system of item 21, wherein the circuitry is configured to:
train a model to perform the accessing, the determining the textual response and the visual response, and the generating the candidate meme.

Item 41. A device comprising:
means for accessing a portion of an electronic communication;
means for determining a textual response and a visual response to the portion of the electronic communication;
means for generating a candidate meme comprising an image including the textual response and the visual response;
means for providing for display as part of the electronic communication a selectable option including display of the candidate meme; and
means for, in response to selection of the selectable option, providing the candidate meme for display within the electronic communication.

Item 42. The device of item 41, comprising:
means for determining whether a meme suggestion mode should be activated based on the electronic communication.

Item 43. The device of item 42, comprising:
means for, in response to determining the meme suggestion mode should be activated, executing the determining, the generating, the providing of the selectable option, and the providing the candidate meme in response to the selection of the selectable option.

Item 44. The device of item 42, wherein the means for determining whether the meme suggestion mode should be activated based on the electronic communication includes means for determining whether a selectable control for enabling the meme suggestion mode is selected.

Item 45. The device of item 44, wherein the selectable control for enabling the meme suggestion mode includes means for generating for display a selectable switch or a selectable button in the electronic communication.

Item 46. The device of item 44, wherein the selectable control for enabling the meme suggestion mode includes an always on mode, an always off mode, and a smart decision mode.

Item 47. The device of item 41, wherein the means for accessing the portion of the electronic communication includes means for determining a context of the portion of the electronic communication.

Item 48. The device of item 47, comprising:
means for, in response to determining the context of the portion of the electronic communication is informal, activating the meme suggestion mode.

Item 49. The device of item 41, wherein the textual response is based on at least one of a context determined from the portion of the electronic communication, an image-to-text process, a user profile, or a meme template.

Item 50. The device of item 42, comprising:
means for, in response to determining the meme suggestion mode should be activated:
determining whether the electronic communication includes a question; and
in response to determining the electronic communication includes the question:
determining an answer to the question; and
including the answer in the textual response.

Item 51. The device of item 41, wherein the visual response is based on a text-to-image diffusion model configured for generating meme images.

Item 52. The device of item 41, wherein the visual response is based on at least one of a context determined from the portion of the electronic communication, a text-to-image process, a user profile, a user-provided image, or a meme template.

Item 53. The device of item 41, comprising:
means for determining an emotion expressed in the portion of the electronic communication, wherein the visual response is based on the emotion.

Item 54. The device of item 42, comprising:
means for monitoring the electronic communication for a change in a topic or an end of the electronic communication; and means for, in response to detecting the change in the topic or the end of the communication, resetting parameters of the meme suggestion mode for a next topic or a next communication.

Item 55. The device of item 41, comprising:
means for determining whether the electronic communication refers to a live event; and
means for, in response to determining the electronic communication refers to the live event:
accessing information about the live event,
wherein the generating the candidate meme includes the information about the live event.

Item 56. The device of item 55, wherein the live event is at least one of a sports event, a reality show, a concert event, a gaming event, a weather event, a climate event, a disaster event, an emergency event, a political event, an election event, a socioeconomic event, a war event, an election event, a stock market event, a news event, a military event, a cultural event, or a community event.

Item 57. The device of item 41, comprising:
means for determining whether the electronic communication refers to a particular subject; and
means for, in response to determining the electronic communication refers to the particular subject:
accessing information about the particular subject,
wherein the generating the candidate meme includes the information about the particular subject, and
wherein the particular subject is at least one of a family member of a participant in the electronic communication, a pet of the participant in the electronic communication, a celebrity, a politician, a famous person, a famous place, a famous object, a first world problem, a consumer product, a change of mind, an achievement, a particular expression, a tagline, a catch phrase, a need to spend an amount of money, an emotion, an escalation of a sentiment, an omniscient perspective, hyperbole, a disaster, a decision between two or more options, or a subject of a popular meme.

Item 58. The device of item 41, wherein the providing for display occurs before receiving a response to a last received text in the electronic communication.

Item 59. The device of item 41, wherein the electronic communication is at least one of an electronic chat, a text message, an internet forum, an electronic message board, an email, a blog, an electronic article, or a comments section of a website, and
wherein the electronic communication includes at least one of text, a session identifier, a context identifier, a user profile, a user preference, a user-provided image, or an image of a face of a user engaged in the electronic communication.

Item 60. The device of item 41, comprising:
means for training a model to perform the accessing, the determining the textual response and the visual response, and the generating the candidate meme.

Item 61. A non-transitory, computer-readable medium having non-transitory, computer-readable instructions encoded thereon, that, when executed perform:
accessing a portion of an electronic communication;
determining a textual response and a visual response to the portion of the electronic communication;
generating a candidate meme comprising an image including the textual response and the visual response;
providing for display as part of the electronic communication a selectable option including display of the candidate meme; and
in response to selection of the selectable option, providing the candidate meme for display within the electronic communication.

Item 62. The non-transitory, computer-readable medium of item 61, comprising:
determining whether a meme suggestion mode should be activated based on the electronic communication.

Item 63. The non-transitory, computer-readable medium of item 62, comprising:
in response to determining the meme suggestion mode should be activated, executing the determining, the generating, the providing of the selectable option, and the providing the candidate meme in response to the selection of the selectable option.

Item 64. The non-transitory, computer-readable medium of item 62, wherein the determining whether the meme suggestion mode should be activated based on the electronic communication includes determining whether a selectable control for enabling the meme suggestion mode is selected.

Item 65. The non-transitory, computer-readable medium of item 64, wherein the selectable control for enabling the meme suggestion mode includes generating for display a selectable switch or a selectable button in the electronic communication.

Item 66. The non-transitory, computer-readable medium of item 64, wherein the selectable control for enabling the meme suggestion mode includes an always on mode, an always off mode, and a smart decision mode.

Item 67. The non-transitory, computer-readable medium of item 61, wherein the accessing the portion of the electronic communication includes determining a context of the portion of the electronic communication.

Item 68. The non-transitory, computer-readable medium of item 67, comprising:
in response to determining the context of the portion of the electronic communication is informal, activating the meme suggestion mode.

Item 69. The non-transitory, computer-readable medium of item 61, wherein the textual response is based on at least one of a context determined from the portion of the electronic communication, an image-to-text process, a user profile, or a meme template.

Item 70. The non-transitory, computer-readable medium of item 62, comprising:
in response to determining the meme suggestion mode should be activated:
determining whether the electronic communication includes a question; and
in response to determining the electronic communication includes the question:
determining an answer to the question; and
including the answer in the textual response.

Item 71. The non-transitory, computer-readable medium of item 61, wherein the visual response is based on a text-to-image diffusion model configured for generating meme images.

Item 72. The non-transitory, computer-readable medium of item 61, comprising:
accessing a user-provided image, wherein the visual response is based on the user-provided image.

Item 73. The non-transitory, computer-readable medium of item 61, comprising:
determining an emotion expressed in the portion of the electronic communication, wherein the visual response is based on the emotion.

Item 74. The non-transitory, computer-readable medium of item 62, comprising:

monitoring the electronic communication for a change in a topic or an end of the electronic communication; and in response to detecting the change in the topic or the end of the communication, resetting parameters of the meme suggestion mode for a next topic or a next communication.

Item 75. The non-transitory, computer-readable medium of item 61, comprising:

determining whether the electronic communication refers to a live event; and in response to determining the electronic communication refers to the live event:

accessing information about the live event, wherein the generating the candidate meme includes the information about the live event.

Item 76. The non-transitory, computer-readable medium of item 75, wherein the live event is at least one of a sports event, a reality show, a concert event, a gaming event, a weather event, a climate event, a disaster event, an emergency event, a political event, an election event, a socio-economic event, a war event, an election event, a stock market event, a news event, a military event, a cultural event, or a community event.

Item 77. The non-transitory, computer-readable medium of item 61, comprising:

determining whether the electronic communication refers to a particular subject; and in response to determining the electronic communication refers to the particular subject:

accessing information about the particular subject, wherein the generating the candidate meme includes the information about the particular subject, and wherein the particular subject is at least one of a family member of a participant in the electronic communication, a pet of the participant in the electronic communication, a celebrity, a politician, a famous person, a famous place, a famous object, a first world problem, a consumer product, a change of mind, an achievement, a particular expression, a tagline, a catch phrase, a need to spend an amount of money, an emotion, an escalation of a sentiment, an omniscient perspective, hyperbole, a disaster, a decision between two or more options, or a subject of a popular meme.

Item 78. The non-transitory, computer-readable medium of item 61, wherein the providing for display occurs before receiving a response to a last received text in the electronic communication.

Item 79. The non-transitory, computer-readable medium of item 61, wherein the electronic communication is at least one of an electronic chat, a text message, an internet forum, an electronic message board, an email, a blog, an electronic article, or a comments section of a website, and wherein the electronic communication includes at least one of text, a session identifier, a context identifier, a user profile, a user preference, a user-provided image, or an image of a face of a user engaged in the electronic communication.

Item 80. The non-transitory, computer-readable medium of item 61, comprising:

training a model to perform the accessing, the determining the textual response and the visual response, and the generating the candidate meme.

Item 81. A method comprising:

accessing, using control circuitry, a portion of an electronic communication;

determining a textual response and a visual response to the portion of the electronic communication;

generating a candidate meme comprising an image including the textual response and the visual response;

providing for display as part of the electronic communication a selectable option including display of the candidate meme; and in response to selection of the selectable option, providing the candidate meme for display within the electronic communication.

Item 82. The method of item 81, comprising:

determining whether a meme suggestion mode should be activated based on the electronic communication.

Item 83. The method of item 82, comprising:

in response to determining the meme suggestion mode should be activated, executing the determining, the generating, the providing of the selectable option, and the providing the candidate meme in response to the selection of the selectable option.

Item 84. The method of items 82 or 83, wherein the determining whether the meme suggestion mode should be activated based on the electronic communication includes determining whether a selectable control for enabling the meme suggestion mode is selected.

Item 85. The method of item 84, wherein the selectable control for enabling the meme suggestion mode includes generating for display a selectable switch or a selectable button in the electronic communication.

Item 86. The method of items 84 or 85, wherein the selectable control for enabling the meme suggestion mode includes an always on mode, an always off mode, and a smart decision mode.

Item 87. The method of any of items 81-86, wherein the accessing the portion of the electronic communication includes determining a context of the portion of the electronic communication.

Item 88. The method of item 87, comprising:

in response to determining the context of the portion of the electronic communication is informal, activating the meme suggestion mode.

Item 89. The method of any of items 81-88, wherein the textual response is based on at least one of a context determined from the portion of the electronic communication, an image-to-text process, a user profile, or a meme template.

Item 90. The method of any of items 82-89, comprising:

in response to determining the meme suggestion mode should be activated:

determining whether the electronic communication includes a question; and in response to determining the electronic communication includes the question:

determining an answer to the question; and including the answer in the textual response.

Item 91. The method of any of items 81-90, wherein the visual response is based on a text-to-image diffusion model configured for generating meme images.

Item 92. The method of any of items 81-91, wherein the visual response is based on at least one of a context determined from the portion of the electronic communication, a text-to-image process, a user profile, a user-provided image, or a meme template.

Item 93. The method of any of items 81-92, comprising:

determining an emotion expressed in the portion of the electronic communication, wherein the visual response is based on the emotion.

Item 94. The method of any of items 82-93, comprising:

monitoring the electronic communication for a change in a topic or an end of the electronic communication; and in response to detecting the change in the topic or the end of the communication, resetting parameters of the meme suggestion mode for a next topic or a next communication.

Item 95. The method of any of items 81-94, comprising:
determining whether the electronic communication refers to a live event; and
in response to determining the electronic communication refers to the live event:
accessing information about the live event,
wherein the generating the candidate meme includes the information about the live event.

Item 96. The method of item 95, wherein the live event is at least one of a sports event, a reality show, a concert event, a gaming event, a weather event, a climate event, a disaster event, an emergency event, a political event, an election event, a socioeconomic event, a war event, an election event, a stock market event, a news event, a military event, a cultural event, or a community event.

Item 97. The method of any of items 81-96, comprising:
determining whether the electronic communication refers to a particular subject; and
in response to determining the electronic communication refers to the particular subject:
accessing information about the particular subject,
wherein the generating the candidate meme includes the information about the particular subject, and
wherein the particular subject is at least one of a family member of a participant in the electronic communication, a pet of the participant in the electronic communication, a celebrity, a politician, a famous person, a famous place, a famous object, a first world problem, a consumer product, a change of mind, an achievement, a particular expression, a tagline, a catch phrase, a need to spend an amount of money, an emotion, an escalation of a sentiment, an omniscient perspective, hyperbole, a disaster, a decision between two or more options, or a subject of a popular meme.

Item 98. The method of any of items 81-97, wherein the providing for display occurs before receiving a response to a last received text in the electronic communication.

Item 99. The method of any of items 81-98, wherein the electronic communication is at least one of an electronic chat, a text message, an internet forum, an electronic message board, an email, a blog, an electronic article, or a comments section of a website, and
wherein the electronic communication includes at least one of text, a session identifier, a context identifier, a user profile, a user preference, a user-provided image, or an image of a face of a user engaged in the electronic communication.

Item 100. The method of any of items 81-99, comprising:
training a model to perform the accessing, the determining the textual response and the visual response, and the generating the candidate meme.

Item 101. A method for enhanced content generation during an electronic conversation, comprising:
generating a candidate image based on at least one of on at least one of a context determined from a portion of the electronic communication, a text-to-image process, a user profile, a user-provided image, or an enhanced content template;
generating a candidate caption based on at least one of the context determined from the portion of the electronic communication, an image-to-text process, the user profile, or the enhanced content template;
determining all possible combinations of the candidate image and the candidate caption;
analyzing the all possible combinations for a likelihood that a candidate enhanced content will be selected by a user;
generating for display a number of top rated candidate enhanced contents;
providing a user selectable option for selecting one of the top rated candidate enhanced contents; and
in response to user selection of the selected one of the top rated candidate enhanced contents, generating for display the selected one of the top rated candidate enhanced contents.

Item 102. A system for enhanced content generation during an electronic conversation, comprising:
circuitry configured to:
generate a candidate image based on at least one of on at least one of a context determined from a portion of the electronic communication, a text-to-image process, a user profile, a user-provided image, or an enhanced content template;
generate a candidate caption based on at least one of the context determined from the portion of the electronic communication, an image-to-text process, the user profile, or the enhanced content template;
determine all possible combinations of the candidate image and the candidate caption;
analyze the all possible combinations for a likelihood that a candidate enhanced content will be selected by a user;
generate for display a number of top rated candidate enhanced contents;
provide a user selectable option for selecting one of the top rated candidate enhanced contents; and
in response to user selection of the selected one of the top rated candidate enhanced contents, generate for display the selected one of the top rated candidate enhanced contents.

Item 103. A device for enhanced content generation during an electronic conversation, comprising:
means for generating a candidate image based on at least one of on at least one of a context determined from a portion of the electronic communication, a text-to-image process, a user profile, a user-provided image, or an enhanced content template;
means for generating a candidate caption based on at least one of the context determined from the portion of the electronic communication, an image-to-text process, the user profile, or the enhanced content template;
means for determining all possible combinations of the candidate image and the candidate caption;
means for analyzing the all possible combinations for a likelihood that a candidate enhanced content will be selected by a user;
means for generating for display a number of top rated candidate enhanced contents;
means for providing a user selectable option for selecting one of the top rated candidate enhanced contents; and
means for, in response to user selection of the selected one of the top rated candidate enhanced contents, generating for display the selected one of the top rated candidate enhanced contents.

Item 104. A non-transitory, computer-readable medium having non-transitory, computer-readable instructions encoded thereon, for enhanced content generation during an electronic conversation, that, when executed perform:

generating a candidate image based on at least one of on at least one of a context determined from a portion of the electronic communication, a text-to-image process, a user profile, a user-provided image, or an enhanced content template;

generating a candidate caption based on at least one of the context determined from the portion of the electronic communication, an image-to-text process, the user profile, or the enhanced content template;

determining all possible combinations of the candidate image and the candidate caption;

analyzing the all possible combinations for a likelihood that a candidate enhanced content will be selected by a user;

generating for display a number of top rated candidate enhanced contents;

providing a user selectable option for selecting one of the top rated candidate enhanced contents; and in response to user selection of the selected one of the top rated candidate enhanced contents, generating for display the selected one of the top rated candidate enhanced contents.

This description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
   accessing a portion of an electronic communication, wherein the accessing the portion of the electronic communication includes determining a context of the portion of the electronic communication;
   determining a textual response and a visual response to the portion of the electronic communication;
   determining whether a meme suggestion mode should be activated based on the electronic communication;
   generating a candidate meme comprising an image including the textual response and the visual response;
   providing for display as part of the electronic communication a selectable option including display of the candidate meme; and
   in response to selection of the selectable option, providing the candidate meme for display within the electronic communication, wherein the textual response is based at least in part on the context determined from the portion of the electronic communication.

2. The method of claim 1, comprising:
   in response to determining the meme suggestion mode should be activated, executing the determining, the generating, the providing of the selectable option, and the providing the candidate meme in response to the selection of the selectable option.

3. The method of claim 1, wherein the determining whether the meme suggestion mode should be activated based on the electronic communication includes determining whether a selectable control for enabling the meme suggestion mode is selected.

4. The method of claim 3, wherein the selectable control for enabling the meme suggestion mode includes generating for display a selectable switch or a selectable button in the electronic communication.

5. The method of claim 3, wherein the selectable control for enabling the meme suggestion mode includes an always on mode, an always off mode, and a smart decision mode.

6. The method of claim 1, comprising:
   in response to determining the context of the portion of the electronic communication is informal, activating the meme suggestion mode.

7. The method of claim 1, wherein the textual response is further based on at least one of an image-to-text process, a user profile, or a meme template.

8. The method of claim 1, comprising:
   in response to determining the meme suggestion mode should be activated:
     determining whether the electronic communication includes a question; and
     in response to determining the electronic communication includes the question:
       determining an answer to the question; and
       including the answer in the textual response.

9. A system comprising:
   circuitry configured to:
     access a portion of an electronic communication, wherein the accessing the portion of the electronic communication includes determining a context of the portion of the electronic communication;
     determine a textual response and a visual response to the portion of the electronic communication;
     determine whether a meme suggestion mode should be activated based on the electronic communication;
     generate a candidate meme comprising an image including the textual response and the visual response;
     provide for display as part of the electronic communication a selectable option including display of the candidate meme; and
     in response to selection of the selectable option, provide the candidate meme for display within the electronic communication, wherein the textual response is based at least in part on the context determined from the portion of the electronic communication.

10. The system of claim 9, wherein the circuitry is configured to:
    in response to determining the meme suggestion mode should be activated, execute the determining, the generating, the providing of the selectable option, and the providing the candidate meme in response to the selection of the selectable option.

11. The system of claim 9, wherein the circuitry configured to determine whether the meme suggestion mode should be activated based on the electronic communication is configured to determine whether a selectable control for enabling the meme suggestion mode is selected.

12. The system of claim 11, wherein the circuitry is configured to:
    generate for display the selectable control for enabling the meme suggestion mode, and
    generate for display a selectable switch or a selectable button in the electronic communication.

13. The system of claim 11, wherein the circuitry is configured to:
    generate for display the selectable control including an always on mode, an always off mode, and a smart decision mode.

14. The system of claim 9, wherein the circuitry is configured to:
    in response to determining the context of the portion of the electronic communication is informal, activate the meme suggestion mode.

15. The system of claim 9, wherein the circuitry is further configured to:

generate the textual response based on at least one of an image-to-text process, a user profile, or a meme template.

16. A method for enhanced content generation during an electronic conversation to generate a meme, the meme includes at least a candidate image and a candidate caption, comprising:

accessing a portion of the electronic communication;

determining whether the meme suggestion mode should be activated based on the electronic communication;

generating the candidate image based on at least one of on at least one of a context determined from a portion of the electronic communication, a text-to-image process, a user profile, a user-provided image, or an enhanced content template;

generating the candidate caption based on at least one of the context determined from the portion of the electronic communication, an image-to-text process, the user profile, or the enhanced content template;

determining all possible combinations of the candidate image and the candidate caption;

analyzing the all possible combinations for a likelihood that a candidate enhanced content will be selected by a user;

generating for display a number of top rated candidate enhanced contents;

providing a user selectable option for selecting one of the top rated candidate enhanced contents; and in response to user selection of the selected one of the top rated candidate enhanced contents, generating for display within the electronic communication the selected one of the top rated candidate enhanced contents.

* * * * *